United States Patent
Oda et al.

(10) Patent No.: US 9,350,007 B2
(45) Date of Patent: May 24, 2016

(54) CONNECTION PLATE FOR BATTERY TERMINALS AND METHOD FOR MANUFACTURING CONNECTION PLATE FOR BATTERY TERMINALS

(75) Inventors: Yoshimitsu Oda, Suita (JP); Masaharu Yamamoto, Minamikawachi-gun (JP); Masaaki Ishio, Osaka (JP)

(73) Assignee: NEOMAX MATERIALS CO., LTD., Suita-shi (JP)

( * ) Notice: Subject to any disclaimer, the term of this patent is extended or adjusted under 35 U.S.C. 154(b) by 0 days.

(21) Appl. No.: 13/981,768

(22) PCT Filed: Jan. 19, 2012

(86) PCT No.: PCT/JP2012/051046
§ 371 (c)(1),
(2), (4) Date: Jul. 25, 2013

(87) PCT Pub. No.: WO2012/102160
PCT Pub. Date: Aug. 2, 2012

(65) Prior Publication Data
US 2013/0309919 A1 Nov. 21, 2013

(30) Foreign Application Priority Data
Jan. 27, 2011 (JP) .................. 2011-015054

(51) Int. Cl.
*H01M 2/20* (2006.01)
*H01R 11/11* (2006.01)
*H01M 10/0525* (2010.01)

(52) U.S. Cl.
CPC .............. *H01M 2/202* (2013.01); *H01M 2/206* (2013.01); *H01R 11/11* (2013.01); *H01M 10/0525* (2013.01); *Y02T 10/7011* (2013.01); *Y10T 29/49224* (2015.01)

(58) Field of Classification Search
None
See application file for complete search history.

(56) References Cited

U.S. PATENT DOCUMENTS 4,775,604 A * 10/1988 Dougherty et al. ........... 429/178
4,934,958 A * 6/1990 Julian .......................... 439/504

(Continued)

FOREIGN PATENT DOCUMENTS

JP 2000-036299 A 2/2000
JP 2000-040500 A 2/2000

(Continued)

OTHER PUBLICATIONS

International Search Report for PCT/JP2012/051046, Mailing Date of Mar. 6, 2012.
Written Opinion for PCT/JP2012/051046, Mailing Date for Mar. 6, 2012.

*Primary Examiner* — Barbara Gilliam
*Assistant Examiner* — Adam A Arciero
(74) *Attorney, Agent, or Firm* — Westerman, Hattori, Daniels & Adrian, LLP

(57) ABSTRACT

A connection plate for battery terminals capable of inhibiting a first member and a second member from being detached from each other is provided. This bus bar 2 (connection plate for battery terminals) includes a first member (3) including a first hole (30) and an embedding hole (31), made of first metal and a second member (4) having a second hole (42), including a base (40) made of second metal, embedded in the embedding hole of the first member, while an intermetallic compound layer (5) containing at least one of the first metal and the second metal is formed on an interface between the embedding hole of the first member and the second member.

20 Claims, 8 Drawing Sheets

(56) References Cited

U.S. PATENT DOCUMENTS

| | | | |
|---|---|---|---|
| 6,168,470 B1 * | 1/2001 | Ikeda | H01M 2/1083 439/620.08 |
| 6,844,110 B2 | 1/2005 | Enomoto et al. | |
| 7,501,202 B2 | 3/2009 | Enomoto et al. | |
| 2001/0049054 A1 | 12/2001 | Enomoto et al. | |
| 2005/0100785 A1 | 5/2005 | Enomoto et al. | |
| 2011/0064993 A1 * | 3/2011 | Ochi | 429/158 |
| 2012/0058360 A1 * | 3/2012 | Oda et al. | 428/600 |
| 2013/0012079 A1 | 1/2013 | Sakae et al. | |

FOREIGN PATENT DOCUMENTS

| | | |
|---|---|---|
| JP | 2001-357834 A | 12/2001 |
| JP | 2002-216716 A | 8/2002 |
| JP | 2002-358945 A | 12/2002 |
| JP | 2008-006496 A | 1/2008 |
| JP | 2011-060623 A | 3/2011 |
| JP | 2011-210482 A | 10/2011 |
| WO | WO 2010137353 A1 * | 12/2010 |

* cited by examiner

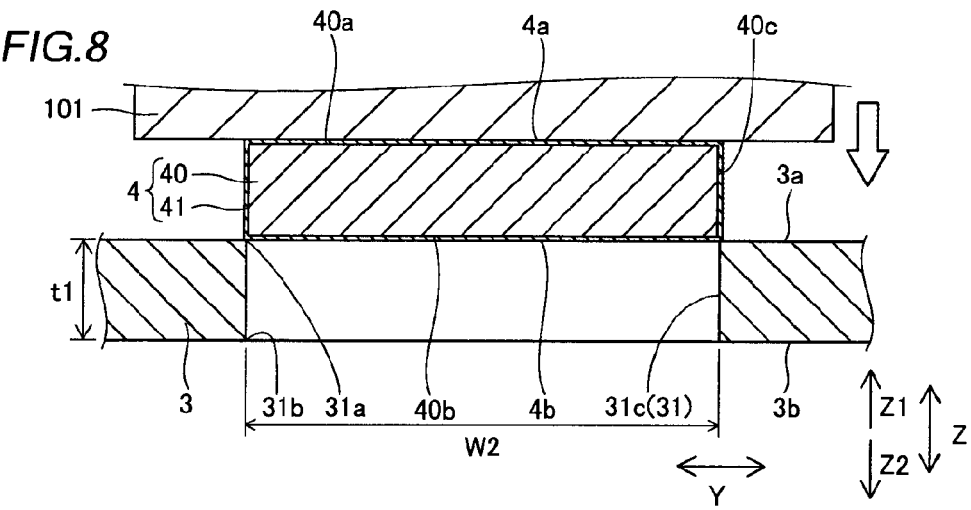
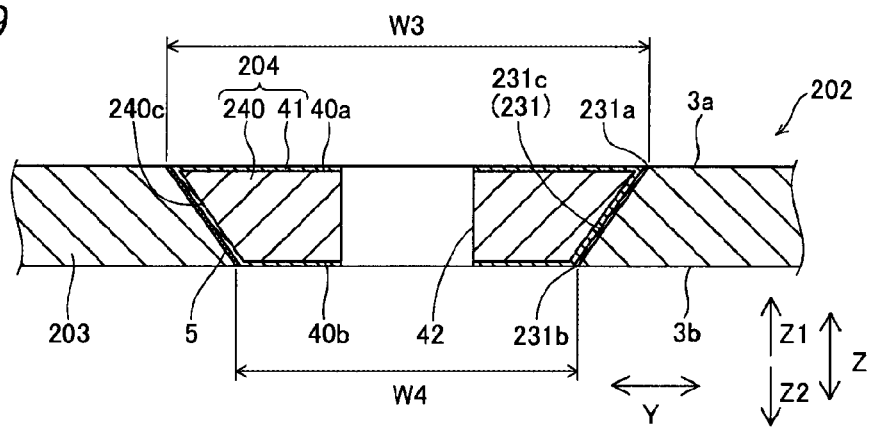
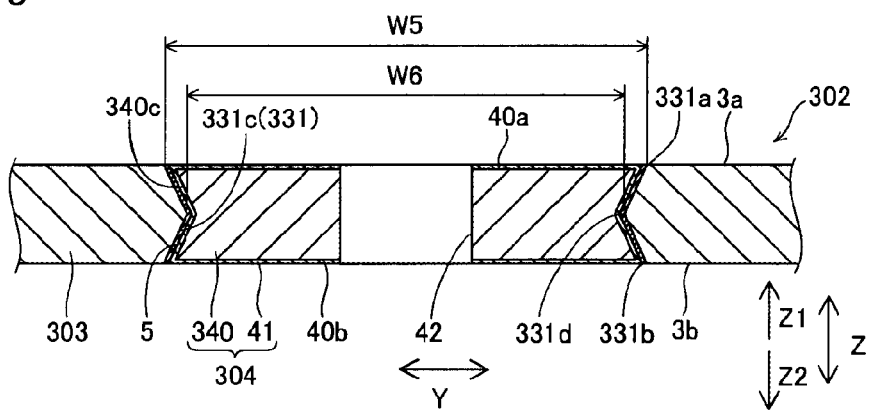

FIG. 15
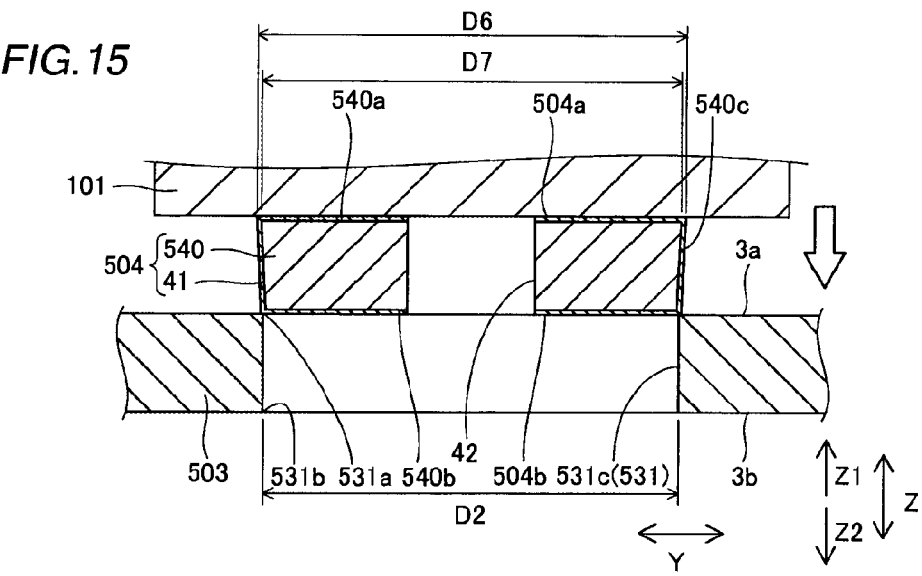
FIG. 16
| DIAMETER D2 OF EMBEDDING HOLE (mm) | SHEAR LOAD (kN) | |
|---|---|---|
| | EXAMPLE 1 | EXAMPLE 2 |
| 9.95 | 0.34 | — |
| 9.90 | 0.67 | — |
| 9.80 | 1.01 | — |
| 9.70 | 1.02 | 1.14 |
FIG. 17
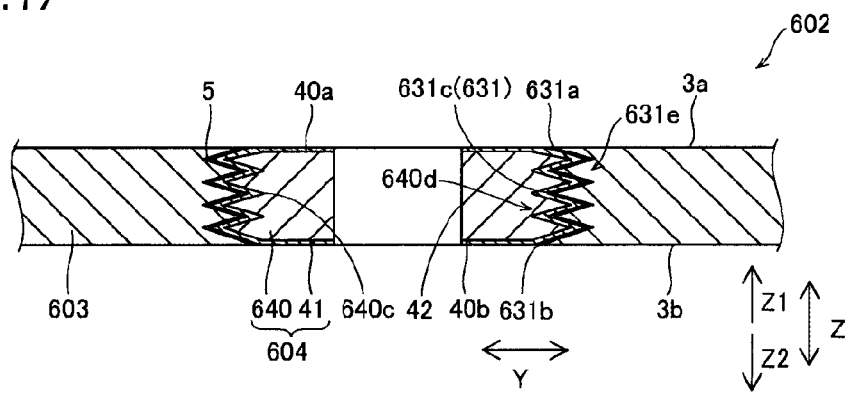

CONNECTION PLATE FOR BATTERY TERMINALS AND METHOD FOR MANUFACTURING CONNECTION PLATE FOR BATTERY TERMINALS

TECHNICAL FIELD

The present invention relates to a connection plate for battery terminals and a method for manufacturing a connection plate for battery terminals, and more particularly, it relates to a connection plate for battery terminals including a first member and a second member and a method for manufacturing a connection plate for battery terminals including a first member and a second member.

BACKGROUND ART

In general, a connection plate for battery terminals including a first member and a second member is known. Such a connection plate for battery terminals is disclosed in Japanese Patent Laying-Open No. 2002-358945, for example.

In the aforementioned Japanese Patent Laying-Open No. 2002-358945, there is disclosed a connection structure of lithium secondary cells (a connection plate for battery terminals) including a plate-like Al member (a first member) having a hole into which an external terminal member made of Cu is inserted and an annular Cu member (a second member) arranged on the inner peripheral surface of the hole of the Al member by interference fit. In this connection structure of lithium secondary cells, the inner peripheral surface of the annular Cu member arranged on the inner peripheral surface of the hole of the Al member and the outer peripheral surface of the external terminal member made of Cu inserted into the hole of the Al member are bonded to each other by welding.

PRIOR ART DOCUMENT

Patent Document

Patent Document 1: Japanese Patent Laying-Open No. 2002-358945

SUMMARY OF THE INVENTION

Problem to be Solved by the Invention

However, in the connection structure of lithium secondary cells disclosed in the aforementioned Patent Laying-Open No. 2002-358945, thermal expansion may cause the inner diameter of the hole of the Al member to be larger than the outer diameter of the annular Cu member when heat is applied to the connection structure even in a case where the annular Cu member (the second member) is arranged on the inner peripheral surface of the hole of the Al member (the first member) by interference fit. In this case, there is such a problem that the Cu member may be detached from the Al member.

The present invention has been proposed in order to solve the aforementioned problem, and an object of the present invention is to provide a connection plate for battery terminals and a method for manufacturing a connection plate for battery terminals each capable of inhibiting a first member and a second member from being detached from each other.

Means for Solving the Problem

A connection plate for battery terminals according to a first aspect of the present invention includes a first member including a first hole into which a first battery terminal made of first metal is inserted and an embedding hole, made of metal identical to the first metal and a second member having a second hole into which a second battery terminal made of second metal different from the first metal is inserted, including a base made of metal identical to the second metal, embedded in the embedding hole of the first member, while an intermetallic compound layer made of an intermetallic compound containing at least one of the first metal and the second metal is formed on an interface between the embedding hole of the first member and the second member.

In this connection plate for battery terminals according to the first aspect of the present invention, as hereinabove described, the intermetallic compound layer made of the intermetallic compound containing at least one of the first metal and the second metal is formed on the interface between the embedding hole of the first member and the second member, whereby the first member and the second member can be bonded to each other by the intermetallic compound layer made of the intermetallic compound, and hence bonding strength between the first member and the second member can be further increased as compared with a case where the second member is simply embedded in the first member. Thus, detachment of the second member from the first member can be inhibited. In addition, the bonding strength between the first member and the second member can be increased, and hence increase in electric resistance on the interface between the first member and the second member resulting from loose bonding of the first member to the second member can be inhibited.

Furthermore, as hereinabove described, the connection plate for battery terminals according to the first aspect includes the first member including the first hole into which the first battery terminal made of the first metal is inserted, made of the metal identical to the first metal and the second member having the second hole into which the second battery terminal made of the second metal different from the first metal is inserted, including the base made of the metal identical to the second metal, whereby the first battery terminal and the first member, both of which are made of the common first metal, can be bonded to each other, and the second battery terminal and the base of the second member, both of which are made of the common second metal, can be bonded to each other. Thus, both electric resistance at a bonding position between the first battery terminal and the first member and electric resistance at a bonding position between the second battery terminal and the base of the second member can be reduced.

Preferably in the aforementioned connection plate for battery terminals according to the first aspect, the first metal is one of Al and Cu, the second metal is the other of Al and Cu, and the intermetallic compound of the intermetallic compound layer contains at least Al. According to this structure, the intermetallic compound containing at least Al can improve the bonding strength between the first member and the second member.

Preferably in the aforementioned connection plate for battery terminals according to the first aspect, the second member further includes a coating layer arranged on at least an interface with the first member on a surface of the base, made of third metal different from the first metal and the second metal, and the intermetallic compound of the intermetallic compound layer has bonding strength between the first member and the second member larger than that of an intermetallic compound containing the first metal and the second metal and contains either the first metal or the second metal and the third metal. According to this structure, the intermetallic compound layer made of the intermetallic compound containing either the first metal or the second metal and the third metal can further increase the bonding strength between the first member and the second member. Furthermore, the coating layer made of the third metal is arranged on at least the interface with the first member on the surface of the base, whereby reaction of the first metal constituting the first member with the second metal constituting the base of the second member can be inhibited. Thus, formation of an intermetallic compound containing the first metal and the second metal, having a bonding strength smaller than that of the intermetallic compound containing either the first metal or the second metal and the third metal in the intermetallic compound layer can be inhibited. Consequently, the bonding strength between the first member and the second member can be further increased, and hence detachment of the second member from the first member can be effectively inhibited.

Preferably in this case, the third metal comprises metal having an ionization tendency higher than that of one of the first metal and the second metal and lower than that of the other of the first metal and the second metal. According to this structure, also in a case where one of the first metal and the second metal having a larger ionization tendency is corroded (undergoes galvanic corrosion) when the first metal constituting the first member and the second metal constituting the base of the second member come into direct contact with each other, the coating layer made of the third metal comprising the metal having the ionization tendency higher than that of one of the first metal and the second metal and lower than that of the other of the first metal and the second metal is arranged on at least the interface with the first member on the surface of the base, so that corrosion of one of the first metal and the second metal having a larger ionization tendency can be inhibited.

Preferably in the aforementioned connection plate for battery terminals in which the ionization tendency of the third metal is between the ionization tendency of the first metal and the ionization tendency of the second metal, the first metal is one of Al and Cu, the second metal is the other of Al and Cu, the third metal is Ni, and the intermetallic compound of the intermetallic compound layer contains Al and Ni. According to this structure, the intermetallic compound layer made of the intermetallic compound containing Al and Ni can further increase the bonding strength between the first member and the second member. Furthermore, the coating layer made of Ni is arranged on at least the interface with the first member on the surface of the base, whereby reaction of Al with Cu can be inhibited, and corrosion of Al having a larger ionization tendency can be inhibited.

Preferably in the aforementioned connection plate for battery terminals according to the first aspect, the first member and the second member are made of rectangular plate materials having long sides extending in an identical direction and short sides extending in an identical direction in a plan view, and the long side and the short side of the second member are shorter than the long side and the short side of the first member, respectively. According to this structure, the second member can be easily embedded in the embedding hole of the first member, and the long side of the second member can be sufficiently ensured. Thus, the second hole can be easily formed in an appropriate position of the second member in the extensional direction of the long side.

Preferably in the aforementioned connection plate for battery terminals according to the first aspect, the embedding hole of the first member has a circular shape in a plan view, and the second member has a columnar shape having the second hole. According to this structure, the second member can be embedded in (pressed into) the embedding hole while force is uniformly applied to the second member, as compared with a case where a plate-like second member is embedded in (pressed into) a rectangular embedding hole, and hence uniform and large bonding strength can be obtained on an entire bonding portion between the embedding hole and the second member.

Preferably in the aforementioned connection plate for battery terminals according to the first aspect, the second member has a frustoconical shape having the second hole, and the embedding hole of the first member has a shape corresponding to the frustoconical shape of the second member. According to this structure, the second member can be embedded in (pressed into) the embedding hole while force is uniformly applied to the second member, as compared with the case where the plate-like second member is embedded in (pressed into) the rectangular embedding hole, and hence uniform and large bonding strength can be obtained on the entire bonding portion between the embedding hole and the second member. In addition, detachment of the frustoconical second member from the side having a smaller diameter of the embedding hole having the shape corresponding to the frustoconical shape can be effectively inhibited.

Preferably in the aforementioned connection plate for battery terminals according to the first aspect, the embedding hole of the first member is so configured that the open width thereof varies from a first surface of the first member toward a second surface thereof. According to this structure, as compared with a case where the open width of the embedding hole is substantially constant from the first surface of the first member toward the second surface thereof, the second member can be more easily embedded in the embedding hole, and the second member, which has been embedded, is more hardly detached from the embedding hole.

Preferably in this case, the embedding hole of the first member is so configured that the open width thereof gradually reduces from the first surface of the first member toward the second surface thereof. According to this structure, the second member can be easily embedded in the embedding hole from the first surface of the first member having the largest open width of the embedding hole. In addition, detachment of the second member, which has been embedded, from the side of the second surface of the first member having the smallest open width of the embedding hole can be effectively inhibited.

Preferably in the aforementioned connection plate for battery terminals in which the open width of the embedding hole varies, the embedding hole of the first member is so configured that the open width thereof reduces from the first surface and the second surface of the first member toward a substantially central portion of the first member in the thickness direction. According to this structure, the second member, which has been embedded, is retained by a substantially central portion of the inner surface of the embedding hole, so that movement of the second member in the thickness direction can be inhibited. Thus, detachment of the second member from the side of the first surface of the embedding hole or the side of the second surface thereof can be effectively inhibited.

Preferably in the aforementioned connection plate for battery terminals according to the first aspect, the embedding hole of the first member has a substantially circular shape in a plan view, the second member has a cylindrical shape and is formed with a screw portion on the outer surface of the second member in contact with the embedding hole, and the screw portion of the second member embedded to be screwed to the inner surface of the embedding hole of the first member. According to this structure, the second member can be more strongly embedded in the embedding hole of the first member as compared with a case the second member is simply embedded in the embedding hole of the first member. Thus, the bonding strength between the first member and the second member can be further increased, and hence detachment of the second member from the first member can be more effectively inhibited.

A method for manufacturing a connection plate for battery terminals according to a second aspect of the present invention includes steps of providing a first hole into which a first battery terminal made of first metal is inserted and an embedding hole in which a second member including a base made of second metal different from the first metal is embedded in a first member made of metal identical to the first metal, embedding the second member in the embedding hole of the first member, providing a second hole into which a second battery terminal made of metal identical to the second metal is inserted in the second member, and forming an intermetallic compound layer made of an intermetallic compound containing at least one of the first metal and the second metal on an interface between the embedding hole of the first member and the second member by diffusion annealing.

As hereinabove described, the method for manufacturing a connection plate for battery terminals according to a second aspect of the present invention includes the step of forming the intermetallic compound layer made of the intermetallic compound containing at least one of the first metal and the second metal on the interface between the embedding hole of the first member and the second member by diffusion annealing, whereby the first member and the second member can be bonded to each other by the intermetallic compound layer made of the intermetallic compound, and hence bonding strength between the first member and the second member can be further increased as compared with a case where the second member is simply embedded in the first member. Thus, detachment of the second member from the first member can be inhibited. In addition, the bonding strength between the first member and the second member can be increased, and hence increase in electric resistance on the interface between the first member and the second member resulting from loose bonding of the first member to the second member can be inhibited. Furthermore, the method for manufacturing a connection plate for battery terminals includes the steps of providing the first hole into which the first battery terminal made of the first metal is inserted in the first member made of the metal identical to the first metal and providing the second hole into which the second battery terminal made of the metal identical to the second metal is inserted in the second member made of the metal identical to the second metal, whereby the first battery terminal and the first member, both of which are made of the common first metal, can be bonded to each other, and the second battery terminal and the base of the second member, both of which are made of the common second metal, can be bonded to each other. Thus, both electric resistance at a bonding position between the first battery terminal and the first member and electric resistance at a bonding position between the second battery terminal and the base of the second member can be reduced.

Preferably in the aforementioned method for manufacturing a connection plate for battery terminals according to the second aspect, the step of providing the second hole in the second member is performed after the step of embedding the second member in the embedding hole of the first member. According to this structure, change in the shape of the second hole can be prevented when the second member is embedded in the embedding hole of the first member, unlike a case where the second member is embedded in the embedding hole of the first member after the second hole is provided in the second member.

Preferably, the aforementioned method for manufacturing a connection plate for battery terminals according to the second aspect further includes a step of forming a coating layer on at least the outer surface of the base of the second member by plating third metal different from the first metal and the second metal on at least the outer surface of the base before the step of embedding the second member in the embedding hole of the first member, and the step of forming the intermetallic compound layer includes a step of forming the intermetallic compound layer made of an intermetallic compound having bonding strength between the first member and the second member larger than that of an intermetallic compound containing the first metal and the second metal and containing either the first metal or the second metal and the third metal on an interface between the embedding hole of the first member and the outer surface of the second member by diffusion annealing. According to this structure, the intermetallic compound containing either the first metal or the second metal and the third metal can further increase the bonding strength between the first member and the second member. Furthermore, the method for manufacturing a connection plate for battery terminals includes the steps of forming the coating layer made of the third metal on at least the outer surface of the base and forming the intermetallic compound layer made of the intermetallic compound containing either the first metal or the second metal and the third metal on the interface between the embedding hole of the first member and the outer surface of the second member, whereby reaction of the first metal constituting the first member with the second metal constituting the base of the second member can be inhibited. Thus, formation of an intermetallic compound containing the first metal and the second metal, having a bonding strength smaller than that of the intermetallic compound containing either the first metal or the second metal and the third metal in the intermetallic compound layer can be inhibited. Consequently, the bonding strength between the first member and the second member can be further increased, and hence detachment of the second member from the first member can be effectively inhibited.

Preferably in the aforementioned method for manufacturing a connection plate for battery terminals according to the second aspect, the step of embedding the second member in the embedding hole of the first member includes a step of pressing the second member into the embedding hole of the first member by applying a pressure to the second member from above in a state where the second member is arranged over the embedding hole of the first member. According to this structure, the second member can be easily embedded in the embedding hole.

Preferably in the aforementioned method for manufacturing a connection plate for battery terminals according to the second aspect, the step of providing the first hole and the embedding hole in the first member includes a step of providing the embedding hole in the first member such that the embedding hole is substantially circular in a plan view, and the step of embedding the second member in the embedding hole of the first member includes a step of embedding the second member in the embedding hole of the first member by screwing the second member having a cylindrical shape, formed with a screw portion on the outer surface thereof to the inner surface of the embedding hole of the first member while rotating the second member. According to this structure, the second member can be more strongly embedded in the embedding hole of the first member as compared with a case the second member is simply embedded in the embedding hole of the first member. Thus, the bonding strength between the first member and the second member can be further increased, and hence detachment of the second member from the first member can be more effectively inhibited.

Preferably, the aforementioned method for manufacturing a connection plate for battery terminals according to the second aspect further includes a step of preparing the second member having a columnar shape with a first diameter, the step of providing the first hole and the embedding hole in the first member includes a step of forming the embedding hole of the first member in a circular shape having a second diameter smaller than the first diameter of the second member, and the step of embedding the second member in the embedding hole of the first member includes a step of pressing the second member into the embedding hole of the first member. According to this structure, the second member is pressed into the embedding hole having the second diameter smaller than the first diameter of the second member, whereby the second member can be strongly embedded in the embedding hole of the first member. Thus, the bonding strength between the first member and the second member can be further increased, and hence detachment of the second member from the first member can be more effectively inhibited. In addition, the second member can be pressed into the embedding hole while force is uniformly applied to the second member, as compared with a case where a plate-like second member is pressed into a rectangular embedding hole, and hence uniform and large bonding strength can be obtained on an entire bonding portion between the embedding hole and the second member.

Preferably in this case, the step of forming the embedding hole of the first member in the circular shape having the second diameter has a step of forming the embedding hole of the first member such that the second diameter is at least 0.2 mm and not more than 1.0 mm less than the first diameter. According to this structure, the second diameter is at least 0.2 mm less than the first diameter, so that the second member can be more strongly embedded in the embedding hole of the first member. Furthermore, the second diameter is not more than 1.0 mm less than the first diameter, so that difficulty in embedding the second member in the embedding hole of the first member resulting from excessive size increase of the second member can be inhibited.

Preferably, the aforementioned method for manufacturing a connection plate for battery terminals according to the second aspect further includes a step of preparing the second member in a frustoconical shape having a first surface with a third diameter and a second surface with a fourth diameter smaller than the third diameter, the step of providing the first hole and the embedding hole in the first member includes a step of forming the embedding hole of the first member in a circular shape having a fifth diameter smaller than the third diameter of the first surface of the second member, and the step of embedding the second member in the embedding hole of the first member includes a step of pressing the second member into the embedding hole of the first member from the side of the second surface of the second member. According to this structure, the second member is pressed into the embedding hole having the fifth diameter smaller than the third diameter of the first surface of the second member, whereby the second member can be more strongly embedded in the embedding hole of the first member. Thus, the bonding strength between the first member and the second member can be further increased, and hence detachment of the second member from the first member can be more effectively inhibited. Furthermore, the second member is pressed into the embedding hole of the first member from the side of the second surface of the second member, whereby the second member can be more easily pressed into the embedding hole of the first member, as compared with a case where the second member is pressed into the embedding hole from the side of the first surface having the third diameter larger than the fourth diameter of the second surface.

Effects of the Invention

According to the present invention, as hereinabove described, detachment of the second member from the first member can be inhibited, and increase in electric resistance on the interface between the first member and the second member resulting from loose bonding of the first member to the second member can be inhibited.

BRIEF DESCRIPTION OF THE DRAWINGS

FIG. 8 A sectional view for illustrating a manufacturing process for the bus bar according to the first embodiment of the present invention.

FIG. 9 A sectional view showing an embedding hole of an Al member and an embedded member according to a second embodiment of the present invention.

FIG. 10 A sectional view showing an embedding hole of an Al member and an embedded member according to a third embodiment of the present invention.

FIG. 15 A sectional view for illustrating a manufacturing process for the bus bar according to the first modification of the fourth embodiment of the present invention.

FIG. 16 A diagram showing results of a confirmation experiment of a shear load conducted to confirm the effects of the present invention.

FIG. 17 A sectional view of a bus bar according to a second modification of the fourth embodiment of the present invention.

MODES FOR CARRYING OUT THE INVENTION

Embodiments of the present invention are hereinafter described on the basis of the drawings.

First Embodiment

The structure of lithium ion battery connections 100 according to a first embodiment of the present invention is now described with reference to FIGS. 1 to 7.

Figure 1:
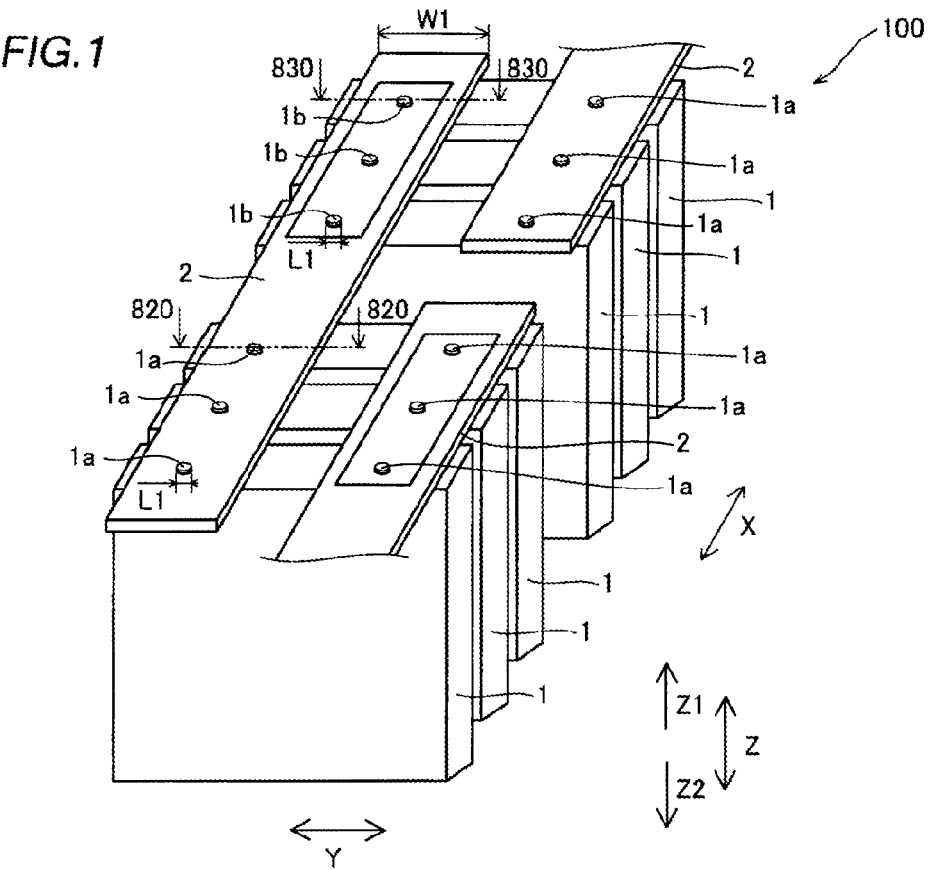
FIG. 1 A perspective view showing the structure of lithium ion battery connections according to a first embodiment of the present invention.

The lithium ion battery connections 100 according to the first embodiment of the present invention are a large battery system employed in an electric vehicle (EV), a hybrid electric vehicle (REV), a residential electric storage system, etc. These lithium ion battery connections 100 are configured by electrically connecting a plurality of lithium ion batteries 1 by a plurality of bus bars 2, as shown in FIG. 1. The bus bars 2 are examples of the "connection plate for battery terminals" in the present invention.

Specifically, in the lithium ion battery connections 100, the lithium ion batteries 1 are arranged in threes along a prescribed direction (a direction X). These lithium ion batteries 1 include positive electrode-side terminals 1a made of Al and negative electrode-side terminals 1b made of Cu. These positive electrode-side terminals 1a and negative electrode-side terminals 1b each have a columnar portion with a diameter L1 of about 4.8 mm extending in a direction Z. The positive electrode-side terminals 1a are examples of the "first battery terminal" in the present invention, and the negative electrode-side terminals 1b are examples of the "second battery terminal" in the present invention. Al is an example of the "first metal" in the present invention, and Cu is an example of the "second metal" in the present invention.

Positive electrode-side terminals 1a of three lithium ion batteries 1 are electrically connected to negative electrode-side terminals 1b of another three lithium ion batteries 1 adjacent on one side by a single bus bar 2. Furthermore, negative electrode-side terminals 1b of the three lithium ion batteries 1 are electrically connected to positive electrode-side terminals 1a of another three lithium ion batteries 1 adjacent on another side by a single bus bar 2. Thus, in the lithium ion battery connections 100, three lithium ion batteries 1 are connected in parallel, and the lithium ion batteries 1 are connected in series, defining the three lithium ion batteries 1 connected in parallel as a unit.

Figure 2:
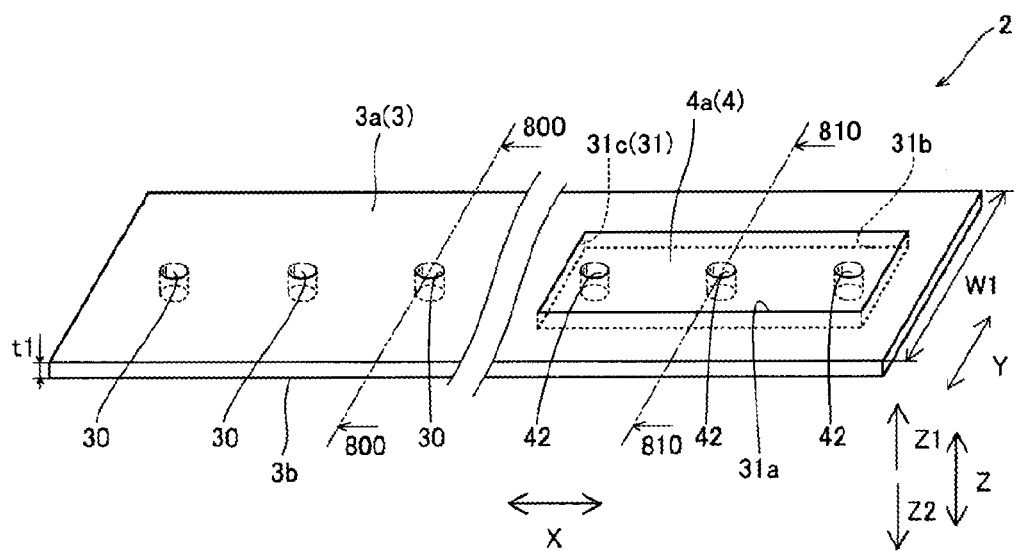
FIG. 2 A perspective view showing the structure of a bus bar mounted on the lithium ion battery connections according to the first embodiment of the present invention.

The bus bars 2 each have a long side extending in the direction X and a short side extending in a direction Y, and are formed of a plate-like member having a rectangular shape as viewed from above (a Z1 side). Furthermore, the bus bars 2 each include an Al member 3 made of metal (Al) identical to the positive electrode-side terminals 1a and an embedded member 4, as shown in FIG. 2. In addition, the bus bars 2 each have a width W1 of about 50 mm in a direction (the direction Y) orthogonal to the direction X and a thickness t1 of about 3 mm in the thickness direction (the direction Z). The Al member 3 and the embedded member 4 are examples of the "first member" and the "second member" in the present invention, respectively.

Figure 3:
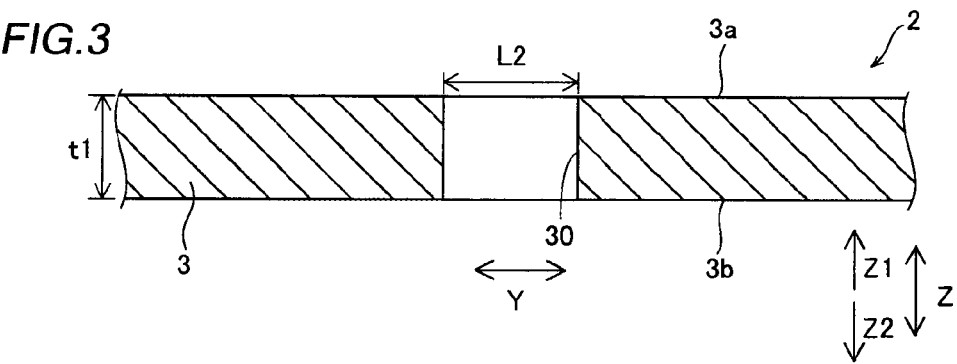
FIG. 3 A sectional view taken along the line 800-800 in FIG. 2.

The Al member 3 has a long side extending in the direction X and a short side extending in the direction Y and is formed of a plate-like member having a rectangular shape as viewed from above (the Z1 side). Furthermore, the Al member 3 is formed with three respective holes 30 into which the positive electrode-side terminals 1a of the lithium ion batteries 1 are inserted, and an embedding hole 31 into which the embedded member 4 is pressed. These three holes 30 are arranged to be aligned at substantially equal intervals in the direction X in a substantially central portion of the Al member 3 in the direction Y. As shown in FIG. 3, the holes 30 each are configured to pass through the Al member 3 in the thickness direction (the direction Z) and have a diameter L2 of about 5 mm. The holes 30 are examples of the "first hole" in the present invention.

The embedding hole 31 is so formed that the center thereof in the direction Y is located substantially at the center of the Al member 3 in direction Y, as shown in FIG. 2. Furthermore, the embedding hole 31 is provided only in the periphery of holes 42, described later, into which the negative electrode-side terminals 1b are inserted. In other words, the bus bar 2 is so configured that the area of a region formed with the embedding hole 31 is smaller than the area of the Al member 3 excluding the embedding hole 31 as viewed from above (the Z1 side).

Figure 4:
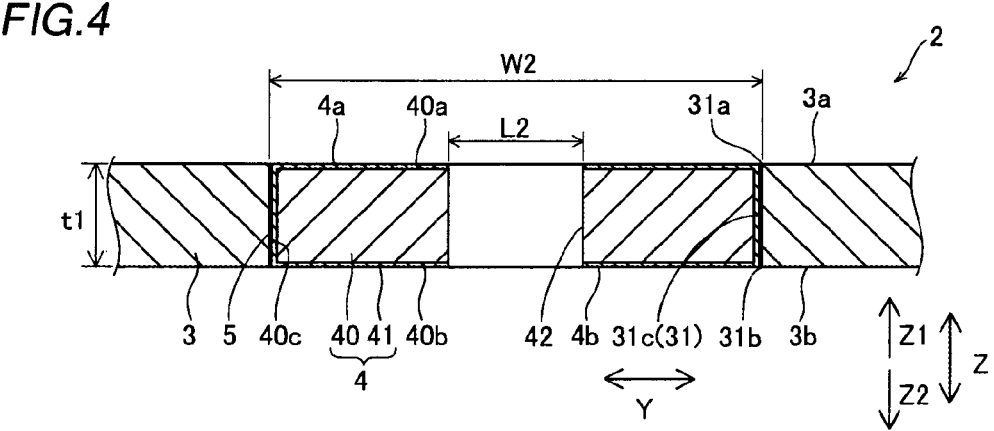
FIG. 4 A sectional view taken along the line 810-810 in FIG. 2.

An open end 31a of the embedding hole 31 on the side of the upper surface 3a of the Al member 3 has a rectangular shape in a plan view (as viewed from above (the Z1 side)), and an open end 31b of the embedding hole 31 on the side of the lower surface 3b of the Al member 3 has a rectangular shape substantially identical to the shape of the open end 31a of the embedding hole 31 in a plan view (as viewed from below (a Z2 side)). As shown in FIG. 4, the embedding hole 31 has an open width W2 in the direction Y and is so configured that this open width W2 is uniform along the thickness direction (the direction Z) from the open end 31a to the open end 31b. The upper surface 3a and the lower surface 3b are examples of the "first surface" and the "second surface" in the present invention, respectively.

The embedded member 4 is pressed into the embedding hole 31 of the Al member 3 along the inner surface of the embedding hole 31. This embedded member 4 has a long side extending in the direction X and a short side extending in the direction Y, and is formed of a plate-like member having a rectangular shape as viewed from above (the Z1 side), as shown in FIG. 2. The bus bar 2 is so configured that the long side of the embedded member 4 extends in a direction (the direction X) identical to the extensional direction of the long side of the Al member 3 (the bus bar 2) and is shorter than the long side of the Al member 3. Similarly, the bus bar 2 is so configured that the short side of the embedded member 4 extends in a direction (the direction Y) identical to the extensional direction of the short side of the Al member 3 and is shorter than the short side of the Al member 3. Furthermore, the bus bar 2 is so configured that the area of the region formed with the embedding hole 31 is smaller than the area of the Al member 3 as viewed from above, whereby the volume of the Al member 3 (a volume occupied by Al) is rendered larger than the volume of the embedded member 4 (a volume occupied by Cu).

The embedded member 4 is constituted by a base 40 made of metal (Cu) identical to the negative electrode-side terminals 1b and a Ni plating layer 41 made of Ni, as shown in FIG. 2. The Ni plating layer 41 is an example of the "coating layer" in the present invention, and Ni is an example of the "third metal" in the present invention. The base 40 is formed with three respective holes 42 into which the negative electrode-side terminals 1b of the lithium ion batteries 1 are inserted. These three holes 42 are arranged to be aligned at substantially equal intervals in the direction X in a substantially central portion of the base 40 in the direction Y. As shown in FIG. 4, the holes 42 each are configured to pass through the base 40 in the thickness direction (the direction Z) and have a diameter substantially equal to the diameter L2 (about 5 mm) of each of the holes 30 of the Al member 3. The holes 42 are examples of the "second hole" in the present invention.

The Ni plating layer 41 of the embedded member 4 is formed on the substantially entire upper surface 40a, the substantially entire lower surface 40b, and the substantially entire outer surface 40c of the base 40. In other words, the Ni plating layer 41 is formed on the outer surface 40c of the base 40 located on an interface between the base 40 and the inner surface 31c of the Al member 3. Thus, the Ni plating layer 41 is configured to inhibit reaction of the Cu constituting the base 40 with Al constituting the Al member 3. On the other hand, the Ni plating layer 41 is not formed on the inner peripheral surface of each of the holes 42 of the base 40. The Ni plating layer 41 has a thickness t2 of at least about 3 μm and not more than about 10 μm.

The bus bar 2 is so configured that the upper surface 4a and the lower surface 4b of the embedded member 4 are substantially coplanar with the upper surface 3a and the lower surface 3b of the Al member 3, respectively, in a state where the embedded member 4 is embedded in the embedding hole 31.

Figure 5:
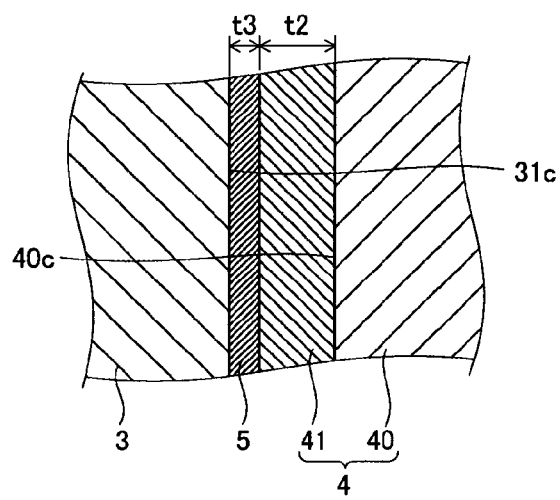
FIG. 5 An enlarged sectional view showing a bonding state between an Al member and an embedded member according to the first embodiment of the present invention.

According to the first embodiment, an intermetallic compound layer 5 is formed on an interface between the inner surface 31c of the embedding hole 31 and the Ni plating layer 41 formed on the outer surface 40c of the base 40 of the embedded member 4, as shown in FIG. 5. This intermetallic compound layer 5 is mainly made of an Al—Ni intermetallic compound formed by causing Al constituting the Al member 3 to react with Ni constituting the Ni plating layer 41. Specifically, Al constituting the Al member 3 binds chemically to Ni constituting the Ni plating layer 41 at a prescribed ratio to form a specified crystal structure, whereby the intermetallic compound layer 5 mainly made of the Al—Ni intermetallic compound is formed on the interface between the inner surface 31c of the embedding hole 31 and the Ni plating layer 41 of the embedded member 4. By this chemical binding of Al to Ni, the Al member 3 is bonded to the embedded member 4.

The Al—Ni intermetallic compound of the intermetallic compound layer 5 further increases bonding strength between the Al member 3 and the embedded member 4 than an Al—Cu intermetallic compound formed by causing Al of the Al member 3 to react with Cu of the base 40 of the embedded member 4 does. The intermetallic compound layer 5 has a thickness t3 of at least about 1 μm and not more than about 5 μm.

Ni of the Ni plating layer 41 has a lower ionization tendency as compared with Al of the Al member 4 whereas Ni of the Ni plating layer 41 has a higher ionization tendency as compared with Cu of the base 40 of the embedded member 4.

Figure 6:
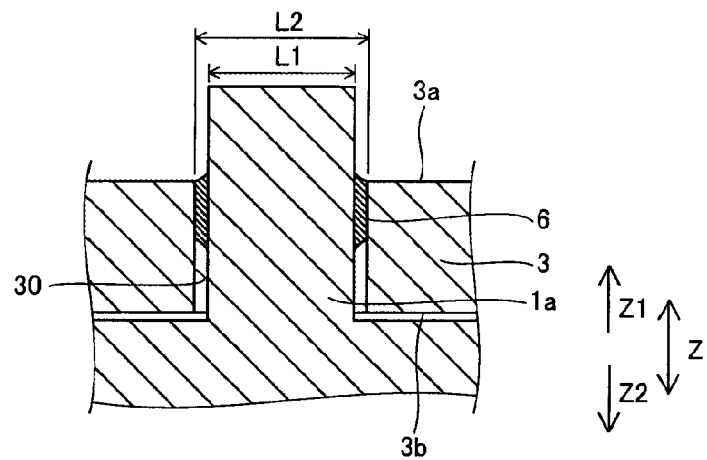
FIG. 6 A sectional view taken along the line 820-820 in FIG. 1.

As shown in FIG. 6, the positive electrode-side terminals 1a inserted into the holes 30 and the Al member 3 are bonded to each other through weld portions 6 made of Al, formed by laser welding. Thus, the positive electrode-side terminals 1a and the holes 30 of the Al member 3 are bonded to each other by the identical metal (Al). Furthermore, the weld portions 6 each are formed with a thickness of about 0.1 mm between the diameter L1 (about 4.8 mm) of each of the positive electrode-side terminals 1a and the diameter L2 (about 5 mm) of each of the holes 30. The weld portions 6 are provided up to the vicinities of the centers of the holes 30 in the direction Z.

Figure 7:
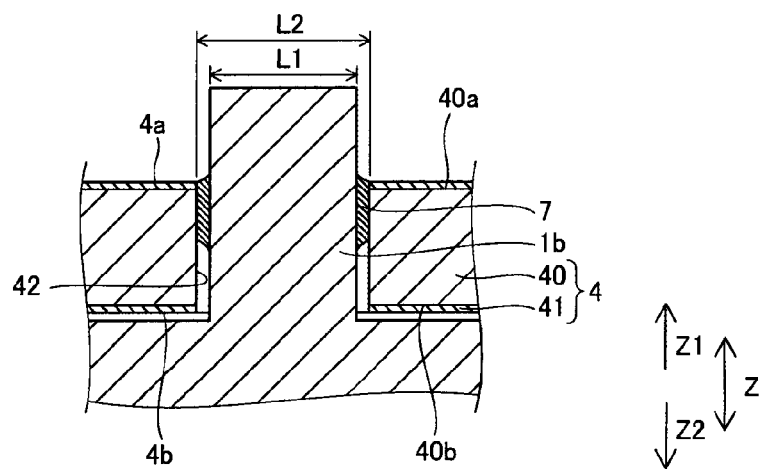
FIG. 7 A sectional view taken along the line 830-830 in FIG. 1.

As shown in FIG. 7, the negative electrode-side terminals 1b inserted into the holes 42 and the base 40 of the embedded member 4 are bonded to each other through weld portions 7 made of Cu, formed by laser welding. Thus, the negative electrode-side terminals 1b and the base 40 of the embedded member 4 are bonded to each other by the identical metal (Cu). Furthermore, the weld portions 7 each are formed with a thickness of about 0.1 mm between the diameter L1 (about 4.8 mm) of each of the negative electrode-side terminals 1b and the diameter L2 (about 5 mm) of each of the holes 42. The weld portions 7 are provided up to the vicinities of the centers of the holes 42 in the direction Z.

A manufacturing process for the bus bar 2 and a manufacturing process for the lithium ion battery connections 100 according to the first embodiment of the present invention are now described with reference to FIGS. 1 to 8.

First, an Al plate (not shown) having a thickness t1 (see FIGS. 3 and 4) of about 3 mm, made of Al is prepared. Then, the three holes 30 each having the diameter L2 (see FIG. 3) of about 5 mm and the embedding hole 31 having the open width W2 in the direction Y are formed in prescribed substantially central positions of the Al plate in the width direction (the direction Y), as shown in FIGS. 2 and 3. Thus, the Al member 3 is formed.

In addition, the base 40 having a thickness t1 of about 3 mm, made of Cu is prepared. Then, Ni plating is performed on a surface of the base 40. Thus, the Ni plating layer 41 having the thickness t2 of at least about 3 μm and not more than about 10 μm is formed on the upper surface 40a, the lower surface 40b, and the outer surface 40c of the base 40. Consequently, the embedded member 4 with no hole 42 is formed. The embedded member 4 is formed to be slightly larger than the open width W2 of the open end 31a (31b) of the embedding hole 31 in the direction Y.

Then, the embedded member 4 is arranged on the upper surface 3a of the Al member 3 to cover the embedding hole 31 of the Al member 3 in a plan view (as viewed from above (the Z1 side)), as shown in FIG. 8. Thereafter, the embedded member 4 is pressed from above (the Z1 side) with a pressing machine 101. Thus, the embedded member 4 is pressed into the embedding hole 31 so that the upper surface 4a and the lower surface 4b of the embedded member 4 are substantially coplanar with the upper surface 3a and the lower surface 3b of the Al member 3, respectively, as shown in FIG. 4. At this time, the embedded member 4 formed to be slightly larger than the open end W2 of the open end 31a (31b) of the embedding hole 31 is embedded in a state compressed in the embedding hole 31. Thus, detachment of the embedded member 4 from the embedding hole 31 is inhibited.

Then, diffusion annealing is performed on the Al member 3 in a state where the embedded member 4 is embedded under a temperature condition of at least about 200° C. and not more than about 500° C. and in a non-oxidation atmosphere or a reducing atmosphere. Thus, Al of the Al member 3 and Ni of the Ni plating layer 41 of the embedded member 4 are diffused to the interface between the Ni plating layer 41 formed on the outer surface 40c of the embedded member 4 and the inner surface 31c of the embedding hole 31 of the Al member 3 and react with each other thereon. Consequently, the intermetallic compound layer 5 (see FIG. 5) mainly made of the Al—Ni intermetallic compound is formed on the interface between the Ni plating layer 41 and the inner surface 31c. At this time, an oxide film of $Al_2O_3$ formed on a surface of the Al member 3 is removed by the diffusion annealing. Thus, contact resistance on the interface between the Ni plating layer 41 and the inner surface 31c can be reduced.

Thereafter, the three holes 42 each having a diameter L2 (see FIG. 4) of about 5 mm are formed in prescribed substantially central positions of the cooled embedded member 4 in the width direction (the direction Y), as shown in FIGS. 2 and 4. In other words, the three holes 42 are formed in the embedded member 4 after the embedded member 4 is pressed into the embedding hole 31. Thus, the bus bar 2 shown in FIG. 2 is manufactured.

Then, the positive electrode-side terminals 1a of the lithium ion batteries 1 are inserted into the three respective holes 30 of the Al member 3. Then, laser welding is performed with laser light having a wavelength of about 1064 nm emitted from a laser welding machine (not shown). Thus, the weld portions 6 made of Al are formed, and the positive electrode-side terminals 1a and the Al member 3 are bonded to each other, as shown in FIG. 6. Furthermore, the negative electrode-side terminals 1b of the lithium ion batteries 1 are inserted into the three respective holes 42 of the embedded member 4. Then, laser welding is performed with laser light having a wavelength of about 1064 nm. Thus, the weld portions 7 made of Cu are formed, and the negative electrode-side terminals 1b and the embedded member 4 are bonded to each other, as shown in FIG. 7. Consequently, the positive electrode-side terminals 1a of the three lithium ion batteries 1 and the negative electrode-side terminals 1b of another three lithium ion batteries 1 are electrically connected to each other.

Then, the lithium ion batteries 1 are connected in series by the plurality of bus bars 2, defining the three lithium ion batteries 1 as a unit. In this manner, the lithium ion battery connections 100 shown in FIG. 1 are manufactured.

According to the first embodiment, as hereinabove described, the intermetallic compound layer 5 made of the Al—Ni intermetallic compound capable of further improving the bonding strength between the Al member 3 and the embedded member 4 than the Al—Cu intermetallic compound does is formed on the interface between the inner surface 31c of the embedding hole 31 of the Al member 3 and the Ni plating layer 41 formed on the outer surface 40c of the base 40 of the embedded member 4, whereby the Al member 3 and the embedded member 4 can be bonded to each other by the intermetallic compound layer 5 made of the Al—Ni intermetallic compound containing Al and Ni, and hence the bonding strength between the Al member 3 and the embedded member 4 can be further increased as compared with a case where the embedded member 4 is simply embedded in the Al member 3. Thus, detachment of the embedded member 4 from the Al member 3 can be effectively inhibited. In addition, the bonding strength between the Al member 3 and the embedded member 4 can be increased, and hence increase in electric resistance on the interface between the Al member 3 and the embedded member 4 resulting from loose bonding of the Al member 3 to the embedded member 4 can be inhibited.

According to the first embodiment, as hereinabove described, the three respective holes 30 into which the positive electrode-side terminals 1a of the lithium ion batteries 1 are inserted are provided in the Al member 3, and the three respective holes 42 into which the negative electrode-side terminals 1b of the lithium ion batteries 1 are inserted are provided in the base 40 of the embedded member 4, whereby the positive electrode-side terminals 1a and the Al member 3, both of which are made of common Al, can be bonded to each other, and the negative electrode-side terminals 1b and the base 40 of the embedded member 4, both of which are made of common Cu, can be bonded to each other. Thus, both electric resistance at bonding positions between the positive electrode-side terminals 1a and the Al member 3 and electric resistance at bonding positions between the negative electrode-side terminals 1b and the base 40 of the embedded member 4 can be reduced.

According to the first embodiment, as hereinabove described, the Ni plating layer 41 is formed on the upper surface 40a, the lower surface 40b, and the outer surface 40c of the base 40, whereby reaction of Al constituting the Al member 3 with Cu constituting the base 40 of the embedded member 4 can be inhibited. Thus, formation of the Al—Cu intermetallic compound containing Al and Cu, having a bonding strength smaller than that of the Al—Ni intermetallic compound in the intermetallic compound layer 5 can be inhibited. Consequently, the bonding strength between the Al member 3 and the embedded member 4 can be further increased. Furthermore, also in a case where Al having a larger ionization tendency is corroded (undergoes galvanic corrosion) when Al and Cu come into direct contact with each other, the Ni plating layer 41 made of Ni having an ionization tendency lower than that of Al and higher than that of Cu is arranged on the outer surface 40c of the base 40 (the interface with the inner surface 31c of the embedding hole 31 of the Al member 3), so that corrosion of Al having a larger ionization tendency can be inhibited. In addition, the Ni plating layer 41 can inhibit corrosion of the base 40 made of Cu under normal circumstances (such as in air).

According to the first embodiment, as hereinabove described, the bus bar 2 is so configured that the upper surface 4a and the lower surface 4b of the embedded member 4 are substantially coplanar with the upper surface 3a and the lower surface 3b of the Al member 3, respectively, in the state where the embedded member 4 is embedded in the embedding hole 31, whereby the embedded member 4 does not protrude from the embedding hole 31 of the Al member 3, and hence detachment (separation) of the embedded member 4 from the Al member 3 resulting from protrusion of the embedded member 4 can be inhibited. Furthermore, the embedded member 4 is embedded in the embedding hole 31 of the Al member 3 in a substantially coplanar manner, whereby the embedded member 4 is located throughout the entire embedding hole 31 of the Al member 3, and hence the intermetallic compound layer 5 can be formed throughout the entire embedding hole 31 of the Al member 3. Thus, the bonding strength between the Al member 3 and the embedded member 4 can be sufficiently ensured, and hence abrupt separation of the embedded member 4 from the Al member 3 can be further inhibited.

According to the first embodiment, as hereinabove described, the bus bar 2 is so formed that the long side of the embedded member 4 extends in the direction (the direction X) identical to the extensional direction of the long side of the Al member 3 (bus bar 2) and is shorter than the long side of the Al member 3, and is so formed that the short side of the embedded member 4 extends in the direction (the direction Y) identical to the extensional direction of the short side of the Al member 3 and is shorter than the short side of the Al member 3, whereby the embedded member 4 can be easily embedded in the embedding hole 31 of the Al member 3, and the long side of the embedded member 4 can be sufficiently ensured. Thus, the holes 42 can be easily formed in appropriate positions of the embedded member 4 in the direction X.

According to the first embodiment, as hereinabove described, the three holes 42 are arranged to be aligned at the substantially equal intervals in the direction X in the substantially central portion of the base 40 in the direction Y, whereby the plurality of lithium ion batteries 1 having the negative electrode-side terminals 1b can be connected to the single bus bar 2. Furthermore, the three holes 42 are formed along the extensional direction (the direction X) of the long side of the embedded member 4, whereby the three holes 42 can be easily formed as compared with a case where the three holes 42 are formed in the extensional direction (the direction Y) of the short side thereof.

According to the first embodiment, as hereinabove described, the bus bar 2 is so configured that the volume of the embedded member 4 (the volume occupied by Cu) is rendered smaller than the volume of the Al member 3 (the volume occupied by Al), whereby also in a case where the embedded member 4 is made of Cu having a specific gravity (density) larger than that of Al, the volume of the embedded member 4 is smaller than the volume of the Al member 3 made of Al, so that excessive weight increase of the bus bar 2 can be inhibited.

According to the first embodiment, as hereinabove described, the Ni plating layer 41 of the embedded member 4 is formed on the substantially entire upper surface 40a, the substantially entire lower surface 40b, and the substantially entire outer surface 40c of the base 40, whereby corrosion of exposed portions of the uncoated upper surface 40a and the uncoated lower surface 40b of the base 40 can be inhibited, unlike a case where the Ni plating layer 41 is partially formed on the upper surface 40a and the lower surface 40b of the base 40. Furthermore, the Ni plating layer 41 is formed on the substantially entire outer surface 40c of the base 40, whereby the intermetallic compound layer 5 mainly made of the Al—Ni intermetallic compound can be formed throughout the substantially entire outer surface 40c of the base 40 arranged in the embedding hole 31 of the Al member 3. Thus, the bonding strength between the Al member 3 and the embedded member 4 can be sufficiently ensured, and hence abrupt separation of the embedded member 4 from the Al member 3 can be effectively inhibited.

According to the first embodiment, as hereinabove described, the Ni plating layer 41 has the thickness t2 of at least about 3 µm and not more than about 10 µm, whereby the thickness t2 of the Ni plating layer 41 is at least about 3 µm, so that reaction of Al of the Al member 3 with Cu of the base 40 can be sufficiently inhibited. Furthermore, the thickness t2 of the Ni plating layer 41 is not more than about 10 µm, so that increase in the time required to form the Ni plating layer 41 can be inhibited.

According to the first embodiment, as hereinabove described, the three holes 42 are formed in the embedded member 4 after the embedded member 4 is pressed into the embedding hole 31, whereby change in the shapes (diameters) of the three holes 42 can be prevented when the embedded member 4 is embedded in the embedding hole 31 of the Al member 3, unlike a case where the embedded member 4 is pressed into the embedding hole 31 after the three holes 42 are provided in the embedded member 4.

According to the first embodiment, as hereinabove described, the embedded member 4 is arranged on the upper surface 3a of the Al member 3 to cover the embedding hole 31 of the Al member 3, and thereafter the embedded member 4 is pressed from above with the pressing machine 101 to be pressed into the embedding hole 31, whereby the embedded member 4 can be easily embedded in the embedding hole 31.

According to the first embodiment, as hereinabove described, the bus bar 2 is so configured that the embedded member 4 including the base 40 made of Cu is embedded in the embedding hole 31 of the Al member 3 made of Al and the area of the Al member 3 (the area occupied by Al) is larger than the area of the embedded member 4 (the area occupied by Cu), whereby a region of the bus bar 2 occupied by Cu more expensive than Al can be reduced as compared with a case where the second member including the base made of Al is embedded in the first member made of Cu. Thus, the bus bar 2 can be manufactured at a low cost.

Second Embodiment

A second embodiment of the present invention is now described with reference to FIG. 9. In this second embodiment, such a case that the open width of an embedding hole 231 of an Al member 203 in a bus bar 202 is gradually reduced from the upper surface 3a of the Al member 203 toward the lower surface 3b thereof is described, unlike in the aforementioned first embodiment. The bus bar 202 is an example of the "connection plate for battery terminals" in the present invention, and the Al member 203 is an example of the "first member" in the present invention.

The embedding hole 231 of the Al member 203 in the bus bar 202 according to the second embodiment of the present invention is so configured that the open width thereof is gradually reduced from the upper surface 3a of the Al member 203 toward the lower surface 3b thereof in a direction Y, as shown in FIG. 9. Specifically, the embedding hole 231 is so configured that the open width W3 of an open end 231a thereof on the side of the upper surface 3a is the largest open width of the embedding hole 231 whereas the open width W4 of an open end 231b thereof on the side of the lower surface 3b is the smallest open width of the embedding hole 231. Furthermore, the inner surface 231c of the embedding hole 231 is formed to be gradually inclined toward the center of the embedding hole 231 from the open end 231a to the open end 231b.

Furthermore, an embedded member 204 is pressed into the embedding hole 231 of the Al member 203 along the inclined inner surface 231c of the embedding hole 231. This embedded member 204 is configured to be deformed to match the shape of the embedding hole 231 when pressed into the embedding hole 231. In other words, the outer surface 240c of a base 240 of the embedded member 204 is formed to be gradually inclined toward the center of the embedded member 204 from an end of an upper surface 40a to an end of a lower surface 40b along the inner surface 231c of the embedding hole 231. The embedded member 204 is an example of the "second member" in the present invention.

Furthermore, a Ni plating layer 41 is formed on the upper surface 40a, the lower surface 40b, and the outer surface 240c of the base 240 of the embedded member 204. An intermetallic compound layer 5 mainly made of an Al—Ni intermetallic compound is formed on an interface between the inner surface 231c of the embedding hole 231 and the Ni plating layer 41 formed on the outer surface 240c of the base 240 of the embedded member 204. The remaining structure according to the second embodiment of the present invention is similar to that of the aforementioned first embodiment.

A manufacturing process for the bus bar 202 according to the second embodiment of the present invention is similar to that of the aforementioned first embodiment except for forming the embedding hole 231 of the Al member 203 so that the open width thereof is gradually reduced from the upper surface 3a of the Al member 203 toward the lower surface 3b thereof.

According to the second embodiment, as hereinabove described, the intermetallic compound layer 5 made of the Al—Ni intermetallic compound is formed on the interface between the inner surface 231c of the embedding hole 231 of the Al member 203 and the Ni plating layer 41 formed on the outer surface 240c of the base 240 of the embedded member 204, whereby detachment of the embedded member 204 from the Al member 203 can be effectively inhibited. In addition, bonding strength between the Al member 203 and the embedded member 204 can be increased, and hence increase in electric resistance on the interface between the Al member 203 and the embedded member 204 resulting from loose bonding of the Al member 203 to the embedded member 204 can be inhibited.

According to the second embodiment, as hereinabove described, the embedding hole 231 of the Al member 203 is so configured that the open width thereof is gradually reduced from the upper surface 3a of the Al member 203 toward the lower surface 3b thereof in the direction whereby the embedded member 204 can be easily embedded in the embedding hole 231 from the open end 231a. In addition, detachment of the embedded member 204, which has been embedded, from the open end 231b can be effectively inhibited. The remaining effects of the second embodiment are similar to those of the aforementioned first embodiment.

Third Embodiment

A third embodiment of the present invention is now described with reference to FIG. 10. In this third embodiment, such a case that the open width of an embedding hole 331 of an Al member 303 in a bus bar 302 is gradually reduced from open ends 331a and 331b toward a central portion 331d of the embedding hole 331 is described, unlike in the aforementioned first embodiment. The bus bar 302 is an example of the "connection plate for battery terminals" in the present invention, and the Al member 303 is an example of the "first member" in the present invention.

The embedding hole 331 of the Al member 303 in the bus bar 302 according to the third embodiment of the present invention is so configured that the open width thereof is gradually reduced from the upper surface 3a and the lower surface 3b of the Al member 303 toward the central portion 331d of the embedding hole 331 in a direction Y, as shown in FIG. 10. Specifically, the embedding hole 331 is so configured that the open width (=W5) of the open end 331a thereof on the side of the upper surface 3a and the open width (=W5) of the open end 331b thereof on the side of the lower surface 3b are the largest open widths of the embedding hole 331. On the other hand, the embedding hole 331 is so configured that the open width W6 of the central portion 331d of the embedding hole 331 is the smallest open width of the embedding hole 331. Furthermore, the inner surface 331c of the embedding hole 331 is formed to be gradually inclined toward the center of the embedding hole 331 from the open ends 331a and 331b to the central portion 331d.

Furthermore, an embedded member 304 is pressed into the embedding hole 331 of the Al member 303 along the inclined inner surface 331c of the embedding hole 331. This embedded member 304 is configured to be deformed to match the shape of the embedding hole 331 when pressed into the embedding hole 331. In other words, the outer surface 340c of a base 340 of the embedded member 304 is formed to be gradually inclined toward the center of the embedded member 304 from an end of an upper surface 40a and an end of a lower surface 40b to a substantially central position in the thickness direction (a direction Z) along the inner surface 331c of the embedding hole 331. The embedded member 304 is an example of the "second member" in the present invention.

Furthermore, a Ni plating layer 41 is formed on the upper surface 40a, the lower surface 40b, and the outer surface 340c of the base 340 of the embedded member 304. An intermetallic compound layer 5 mainly made of an Al—Ni intermetallic compound is formed on an interface between the inner surface 331c of the embedding hole 331 and the Ni plating layer 41 formed on the outer surface 340c of the base 340 of the embedded member 304. The remaining structure according to the third embodiment of the present invention is similar to that of the aforementioned first embodiment.

A manufacturing process for the bus bar 302 according to the third embodiment of the present invention is similar to that of the aforementioned first embodiment except for forming the embedding hole 331 of the Al member 303 so that the open width thereof is gradually reduced from the upper surface 3a and the lower surface 3b of the Al member 303 toward the central portion 331d of the embedding hole 331.

According to the third embodiment, as hereinabove described, the intermetallic compound layer 5 made of the Al—Ni intermetallic compound is formed on the interface between the inner surface 331c of the embedding hole 331 of the Al member 303 and the Ni plating layer 41 formed on the outer surface 340c of the base 340 of the embedded member 304, whereby detachment of the embedded member 304 from the Al member 303 can be effectively inhibited. In addition, bonding strength between the Al member 303 and the embedded member 304 can be increased, and hence increase in electric resistance on the interface between the Al member 303 and the embedded member 304 resulting from loose bonding of the Al member 303 to the embedded member 304 can be inhibited.

According to the third embodiment, as hereinabove described, the embedding hole 331 of the Al member 303 is so configured that the open width thereof is gradually reduced from the upper surface 3a of the Al member 303 toward the central portion 331d of the embedding hole 331 in the direction Y and is gradually reduced from the lower surface 3b toward the central portion 331d in the direction Y, whereby the embedded member 304, which has been embedded, is retained by the central portion 331d of the inner surface 331c of the embedding hole 331, so that movement of the embedded member 304 in the thickness direction (the direction Z) can be inhibited. Thus, detachment of the embedded member 304 from the open ends 331a and 331b can be effectively inhibited. The remaining effects of the third embodiment are similar to those of the aforementioned first embodiment.

Fourth Embodiment

Figure 12:
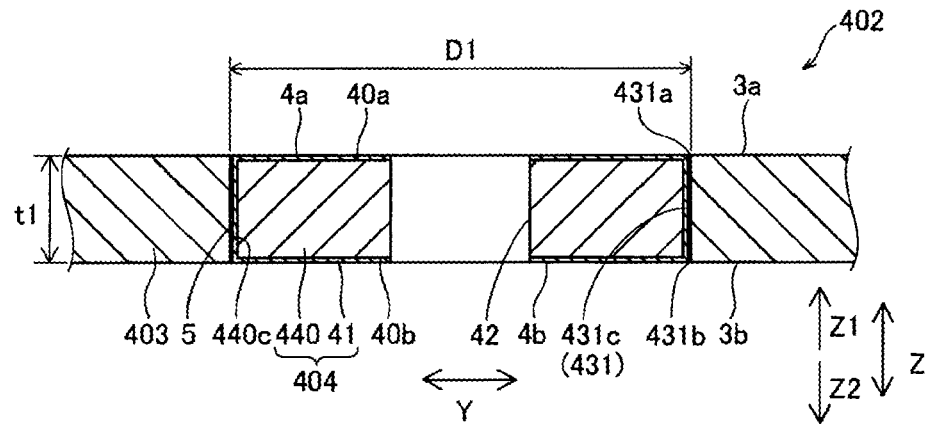
FIG. 12 A sectional view taken along the line 840-840 in FIG. 11.
Figure 13:
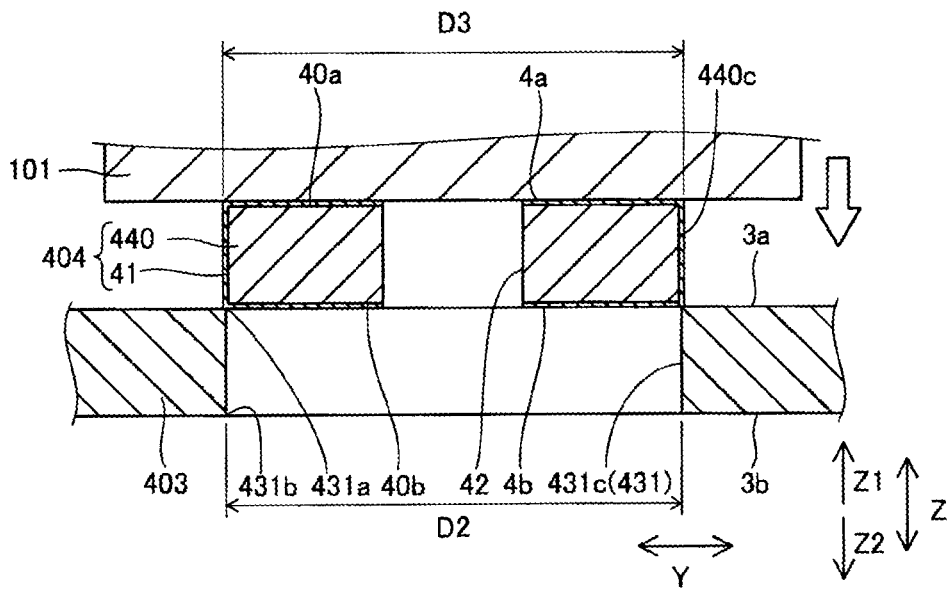
FIG. 13 A sectional view for illustrating a manufacturing process for the bus bar according to the fourth embodiment of the present invention.

A fourth embodiment of the present invention is now described with reference to FIGS. 11 to 13. In relation to a bus bar 402 according to this fourth embodiment, such a case that columnar embedded members 404 are pressed into circular embedding holes 431 of an Al member 403 unlike the aforementioned first embodiment is described. The bus bar 402, the Al member 403, and the embedded members 404 are examples of the "connection plate for battery terminals", the "first member", and the "second member" in the present invention, respectively.

Figure 11:
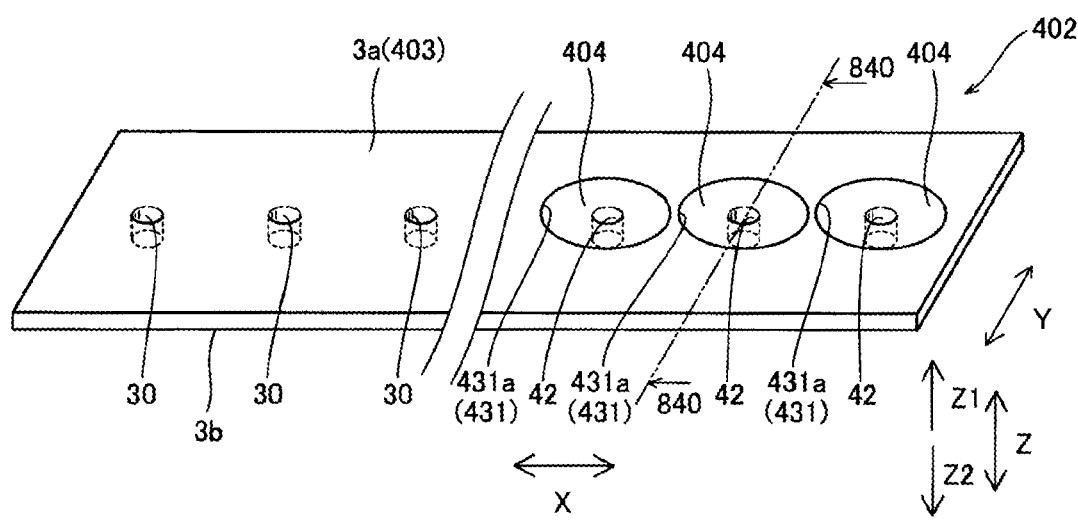
FIG. 11 A perspective view showing the structure of a bus bar according to a fourth embodiment of the present invention.

Three embedding holes 431 are formed at prescribed intervals in a direction X in the Al member 403 of the bus bar 402 according to the fourth embodiment of the present invention, as shown in FIG. 11. As shown in FIG. 12, the embedding holes 431 each are circularly formed with a diameter D1 in a plan view. The three embedding holes 431 are provided to correspond to three respective holes 42 (see FIG. 11) into which negative electrode-side terminals 1b are inserted.

Furthermore, the columnar embedded members 404 having the holes 42 are embedded in the three respective embedding holes 431 of the Al member 403 by press fitting. Ni plating layers 41 are formed on the upper surfaces 40a, the lower surface 40b, and the outer surfaces 440c of bases 440 of these embedded members 404. Furthermore, intermetallic compound layers 5 mainly made of an Al—Ni intermetallic compound are formed on interfaces between the inner surfaces 431c of the embedding holes 431 and the Ni plating layers 41 formed on the outer surfaces 440c of the bases 440 of the embedding members 404. The remaining structure according to the fourth embodiment of the present invention is similar to that of the aforementioned first embodiment.

A manufacturing process for the bus bar 402 according to the fourth embodiment of the present invention is now described with reference to FIGS. 11 to 13.

First, an Al plate (not shown) is prepared. Then, three holes 30 and the three embedding holes 431 each having a diameter D2 (see FIG. 13) slightly smaller than the diameter D1 (see FIG. 12) are formed in prescribed substantially central positions of the Al plate in the width direction (a direction Y), as shown in FIG. 11. Thus, the Al member 403 is formed. In addition, three columnar bases 440 each having a diameter D3, made of Cu are prepared, as shown in FIG. 13. Then, Ni plating is performed on surfaces of the bases 440. Thus, the Ni plating layers 41 are formed on the upper surfaces 40a, the lower surfaces 40b, and the outer surfaces 440c of the bases 440. Consequently, the columnar embedded members 404 each having a diameter D3 are formed. Thereafter, the holes 42 are formed in the embedded members 404. The diameter D2 and the diameter D3 are examples of the "second diameter" and the "first diameter" in the present invention, respectively.

In the manufacturing process according to the fourth embodiment, the embedding holes 431 each are so formed that the diameter D2 thereof is at least 0.2 mm and not more than 1.0 mm less than the diameter D3 of each of the embedded members 404.

Then, the embedded members 404 formed with the holes 42 are pressed into the three respective embedding holes 431 of the Al member 403 with a pressing machine 101, similarly to the aforementioned first embodiment. At this time, the embedded members 404 each having the diameter D3 which is at least 0.2 mm and not more than 1.0 mm more than the diameter D2 of each of the embedding holes 431 are embedded in the embedding holes 431, whereby the embedding holes 431 are widened by pressing, and the diameter of each of the embedding holes 431 becomes the diameter D1 (see FIG. 12) slightly larger than the diameter D2.

Thereafter, diffusion annealing is performed, whereby the intermetallic compound layers 5 (see FIG. 12) mainly made of the Al—Ni intermetallic compound are formed on the interfaces between the Ni plating layers 41 and the inner surfaces 431c. Thus, the bus bar 402 shown in FIG. 11 is manufactured.

According to the fourth embodiment, as hereinabove described, the intermetallic compound layers 5 mainly made of the Al—Ni intermetallic compound are formed on the interfaces between the inner surfaces 431c of the embedding holes 431 of the Al member 403 and the Ni plating layers 41 formed on the outer surfaces 440c of the embedded members 404, whereby detachment of the embedded members 404 from the Al member 403 can be effectively inhibited. In addition, bonding strength between the Al member 403 and the embedded members 404 can be increased, and hence increase in electric resistance on the interfaces between the Al member 403 and the embedded members 404 resulting from loose bonding of the Al member 403 to the embedded members 404 can be inhibited.

According to the fourth embodiment, as hereinabove described, the embedding holes 431 each have a circular shape in a plan view, and the embedded members 404 each have a columnar shape having a hole 42, whereby the embedded members 404 can be pressed into the embedding holes 431 while force is uniformly applied to the embedded members 404, as compared with a case where plate-like embedded members are pressed into rectangular embedding holes, and hence uniform and large bonding strength can be obtained on entire bonding portions between the embedding holes 431 and the embedded members 404.

According to the fourth embodiment, as hereinabove described, the embedding holes 431 each are so formed that the diameter D2 thereof is at least 0.2 mm and not more than 1.0 mm less than the diameter D3 of each of the embedded members 404, whereby the embedded members 404 are embedded in the embedding holes 431 each having the diameter D2 which is at least 0.2 mm less than the diameter D3, so that the embedded members 404 can be more strongly embedded in the embedding holes 431 of the Al member 403. Thus, the bonding strength between the Al member 403 and the embedded members 404 can be further increased, and hence detachment of the embedded members 404 from the Al member 403 can be more effectively inhibited. Furthermore, the diameter D2 is not more than 1.0 mm less than the diameter D3, so that difficulty in embedding the embedded members 404 in the embedding holes 431 of the Al member 403 resulting from excessive size increase of the embedded members 404 can be inhibited. The remaining effects of the fourth embodiment are similar to those of the aforementioned first embodiment.

(First Modification of Fourth Embodiment)

A first modification of the fourth embodiment of the present invention is now described with reference to FIGS. 14 and 15. In relation to a bus bar 502 according to this first modification of the fourth embodiment, such a case that frustoconical embedded members 504 are pressed into embedding holes 531 of an Al member 503 unlike the aforementioned fourth embodiment is described. The bus bar 502, the Al member 503, and the embedded members 504 are examples of the "connection plate for battery terminals", the "first member", and the "second member" in the present invention, respectively.

Figure 14:
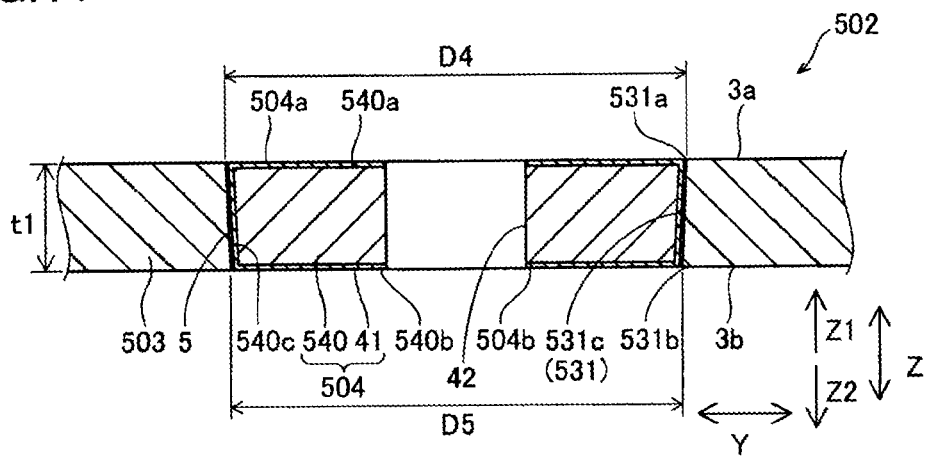
FIG. 14 A sectional view showing a bus bar according to a first modification of the fourth embodiment of the present invention.

The embedding holes 531 of the Al member 503 according to the first modification of the fourth embodiment of the present invention have open ends 531a each circularly formed with a diameter D4 on the side of an upper surface 3a and open ends 531b each circularly formed with a diameter D5 smaller than the diameter D4 on the side of a lower surface 3b, as shown in FIG. 14. Furthermore, the embedding holes 531 are so formed that the inner surfaces 531c thereof are gradually inclined from the open ends 531a toward the open ends 531b.

The frustoconical embedded members 504 having holes 42 are embedded in the embedding holes 531 of the Al member 503 by press fitting. In other words, the frustoconical embedded members 504 each are formed in a frustoconical shape having a circular upper surface 504a with a diameter D4 and a circular lower surface 504b with a diameter D5 smaller than the diameter D4. Consequently, the embedding holes 531 are formed to have shapes corresponding to the shapes of the frustoconical embedded members 504. The upper surface 504a and the lower surface 504b are examples of the "first surface" and the "second surface" in the present invention, respectively. The remaining structure according to the first modification of the fourth embodiment of the present invention is similar to that of the aforementioned fourth embodiment.

A manufacturing process for the bus bar 502 according to the first modification of the fourth embodiment of the present invention is now described with reference to FIGS. 11, 14, and 15.

First, the Al member 503 formed with three holes 30 and three embedding holes 531 each having a diameter D2 (see FIG. 15) slightly smaller than the diameter D5 (see FIG. 14)

is prepared, similarly to the Al member 403 (see FIG. 11) according to the aforementioned fourth embodiment.

In addition, frustoconical bases 540 made of Cu are prepared, as shown in FIG. 15. Specifically, the upper surfaces 504a (surfaces on a Z1 side) of the bases 540 each are circularly formed with a diameter D6 larger than the diameter D4 (see FIG. 14), and the lower surfaces 504b (surfaces on a Z2 side) thereof each are circularly formed with a diameter D7 which is about 0.2 mm less than the diameter D6. The diameter D7 is larger than the diameter D5 (see FIG. 14). The bases 504 are configured to be gradually reduced in size from the Z1 side toward the Z2 side. Then, Ni plating is performed on surfaces of the frustoconical bases 540, whereby the frustoconical embedded members 504 are formed. Thereafter, the holes 42 are formed in the embedded members 504. The diameter D2, the diameter D6, and the diameter D7 are examples of the "fifth diameter", the "third diameter", and the "fourth diameter" in the present invention, respectively.

In the manufacturing process according to the first modification of the fourth embodiment, the embedding holes 531 each are so formed that the diameter D2 thereof is at least 0.2 mm and not more than 1.0 mm less than the diameter D6 of the upper surface 504a of each of the embedded members 504. Furthermore, the embedding holes 531 each are so formed that the diameter D2 thereof is slightly smaller than the diameter D7 of the lower surface 504b of each of the embedded members 504. Thus, not only the sides of the upper surfaces 504a of the embedded members 504 but also the sides of the lower surfaces 504b thereof can be brought into close contact with the inner surfaces 531c of the embedding holes 531.

Thereafter, the embedded members 504 are arranged on the upper surface 3a of the Al member 503 such that the lower surfaces 504b of the embedded members 504 are opposed to the embedding holes 531 of the Al member 503. Then, the embedded members 504 are pressed into the embedding holes 531 of the Al member 503 from the sides of the lower surfaces 504b of the embedded members 504. At this time, the embedded members 504 are embedded in the embedding holes 531 from the sides of the lower surfaces 504b each having the diameter D7 slightly larger than the diameter D2 of each of the embedding holes 531, whereby the embedding holes 531 are widened by pressing. Consequently, in the embedding holes 531, the open ends 531a on the side of the upper surface 3a each have the diameter D4 (see FIG. 14) slightly larger than the diameter D6, and the open ends 531b on the side of the lower surface 3b each have the diameter D5 (see FIG. 14) slightly larger than the diameter D7. The remaining steps of the manufacturing process according to the first modification of the fourth embodiment of the present invention are similar to those in the fourth embodiment.

According to the first modification of the fourth embodiment, as hereinabove described, the open ends 531b of the embedding holes 531 on the side of the lower surface 3b each are circularly formed with the diameter D5 smaller than the diameter D4 of each of the open ends 531a on the side of the upper surface 3a, so that the embedding holes 531 are formed to have the shapes corresponding to the shapes of the frustoconical embedded members 504. Thus, detachment of the frustoconical embedded members 504 from the sides of the open ends 531b, the diameters of which are smaller, of the embedding holes 531 having the shapes corresponding to the frustoconical shapes can be effectively inhibited.

According to the first modification of the fourth embodiment, as hereinabove described, the embedded members 504 are pressed into the embedding holes 531 of the Al member 503 from the sides of the lower surfaces 504b of the embedded members 504, whereby the embedded members 504 can be more easily pressed into the embedding holes 531 of the Al member 503, as compared with a case where the embedded members 504 are pressed into the embedding holes 531 from the sides of the upper surfaces 504a each having the diameter D6 larger than the diameter D7 of each of the lower surfaces 504b. The remaining effects of the first modification of the fourth embodiment of the present invention are similar to those of the aforementioned fourth embodiment.

EXAMPLES

A confirmation experiment of a shear load conducted to confirm the effects of the fourth embodiment and the first modification of the fourth embodiment of the present invention is now described with reference to FIGS. 13 to 16.

In the confirmation experiment of a shear load described below, the columnar embedded members 404 (see FIG. 13) each having the diameter D3 of 10.0 mm were employed as Example 1 corresponding to the aforementioned fourth embodiment. The frustoconical embedded members 504 (see FIG. 15) each having the upper surface 504a with the diameter D6 of 10.0 mm and the lower surface 504b with the diameter D7 of 9.8 mm were employed as Example 2 corresponding to the aforementioned first modification of the fourth embodiment.

In Example 1, Al members 403 having embedding holes 431, the diameters D2 of which were different from each other, were employed. Specifically, four Al members 403 having embedding holes 431, the diameters D2 of which were 9.95 mm, 9.90 mm, 9.80 mm, and 9.70 mm, were employed. In Example 2, an Al member 503 having embedding holes 531, the diameters D2 of which each was 9.70 mm, was employed. The thickness t1 of each of the embedded members 404 and 504 and the Al members 403 and 503 was 3 mm.

Then, the embedded members according to Examples 1 and 2 were pressed into the corresponding embedding holes of the Al members. At this time, in Example 2, the embedded members 504 were pressed into the embedding holes 531 of the Al member 503 from the sides of the lower surfaces 504b of the embedded members 504. Thereafter, the Al members were held for three minutes under a temperature condition of 500° C. and in a non-oxidation atmosphere, whereby diffusion annealing was performed. Thus, bus bars according to Examples 1 and 2 were prepared.

Thereafter, the confirmation experiment of a shear load was conducted on each of the bus bars according to Examples 1 and 2. Specifically, a load was applied to portions of the bus bars where the embedded members were embedded from above (a Z1 side) at the rate of 1 mm per minute. Then, loads when the Al members and the embedded members were fractured were measured as shear loads.

It was found from results of measurement of the shear loads shown in FIG. 16 that as differences (D3–D2) between the diameters D2 of the embedding holes 431 and the diameters D3 of the embedded members 404 increased, the shear loads increased in Example 1. Furthermore, when the differences (D3–D2) were 0.2 mm or more in Example 1, the shear loads were 1 kN or more. Thus, it is conceivable that the bonding strength between the Al member 403 and the embedded members 404 can be sufficiently increased by increasing the difference (D3–D2) to 0.2 mm or more.

When the diameters D2 of the embedding holes were 9.70 mm, the shear load in Example 2 was larger as compared with the shear load in Example 1. This is considered to be because the embedded members 504 were easily pressed into the embedding holes 531 by pressing the frustoconical embedded members 504 according to Example 2 into the embedding holes 531 from the sides of the lower surfaces 504b with smaller diameters. Thus, the embedded members 504 were pressed into the embedding holes 531 in a state where the outer surfaces 540c of the embedded members 504 and the inner surfaces 531c of the embedding holes 531 were uniformly brought into close contact with each other, and hence the intermetallic compound layers 5 (see FIG. 14) were uniformly formed on the interfaces between the outer surfaces 540c of the embedded members 504 and the inner surfaces 531c of the embedding holes 531. Therefore, it is conceivable that the bonding strength between the Al member 503 and the embedded members 504 was increased. From these results, it was found that the bonding strength between the Al member and the embedded members could be further increased in the case of employing the frustoconical embedded members as compared with the case of employing the columnar embedded members.

Also in the case of Example 2, it is conceivable that the bonding strength between the Al member 503 and the embedded members 504 can be sufficiently increased by increasing differences (D6−D2) between the diameters D2 of the embedding holes 531 and the diameters D6 of the upper surfaces 504a of the embedded members 504 to 0.2 mm or more.

(Second Modification of Fourth Embodiment)

A second modification of the fourth embodiment of the present invention is now described with reference to FIGS. 17 and 18. In relation to a bus bar 602 according to this second modification of the fourth embodiment, such a case that embedded members 604 are screwed to embedding holes 631 of an Al member 603 unlike the aforementioned fourth embodiment is described. The bus bar 602 is an example of the "connection plate for battery terminals". The Al member 603 and the embedded members 604 are examples of the "first member" and the "second member" in the present invention, respectively.

As shown in FIG. 17, screw portions 631e having screw threads and thread grooves alternately located in a direction Z are formed on the inner surfaces 631c of the embedding holes 631 of the Al member 603 according to the second modification of the fourth embodiment of the present invention. In other words, the embedding holes 631 are formed as internal threads. The cylindrical embedded members 604 are screwed to the embedding holes 631 of the Al member 603. Specifically, screw portions 640d having screw threads and thread grooves alternately located in the direction Z are formed on the outer surfaces 640c of bases 640 of the cylindrical embedded members 604. In other words, the bases 640 (the embedded members 604) are formed as external threads. Consequently, the embedded members 604 formed as external threads are screwed to the embedding holes 631 formed as internal threads, whereby the embedded members 604 are embedded in the embedding holes 631.

Furthermore, Ni plating layers 41 are formed on the upper surfaces 40a, the lower surfaces 40b, and the outer surfaces 640c of the bases 640 of the embedded members 604. In addition, intermetallic compound layers 5 mainly made of an Al—Ni intermetallic compound are formed on interfaces between the inner surfaces 631c of the embedding holes 631 and the Ni plating layers 41 formed on the outer surfaces 640c of the bases 640 of the embedded members 604. The remaining structure according to the second modification of the fourth embodiment of the present invention is similar to that of the aforementioned fourth embodiment.

A manufacturing process for the bus bar 602 according to the second modification of the fourth embodiment of the present invention is now described with reference to FIGS. 17, and 18.

Figure 18:
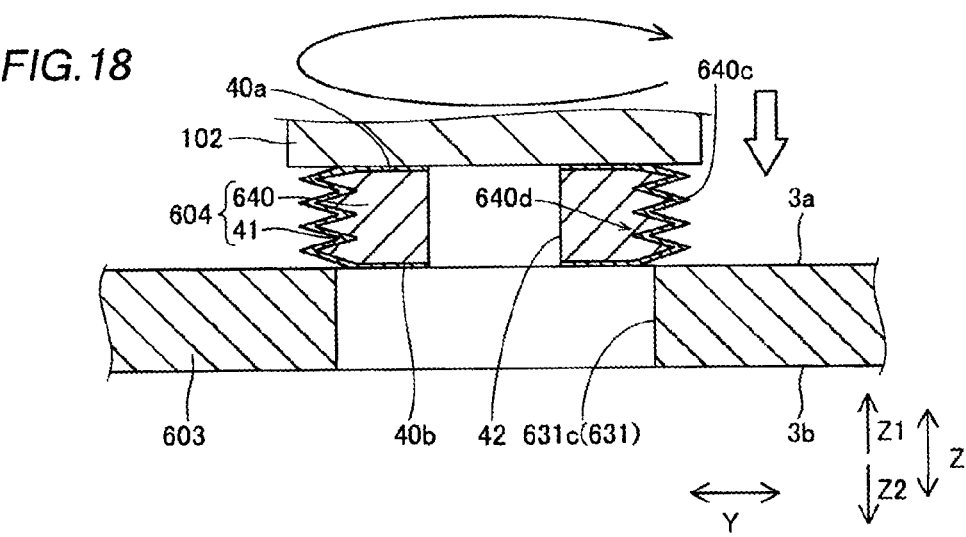
FIG. 18 A sectional view for illustrating a manufacturing process for the bus bar according to the second modification of the fourth embodiment of the present invention.

First, an Al member 603 having a structure similar to that of the Al member 403 (see FIG. 11) according to the fourth embodiment is prepared, as shown in FIG. 18. At this time, no screw portion 631e (see FIG. 17) constituted by the screw threads and the thread grooves is formed on the inner surfaces 631c of the embedding holes 631.

The bases 640 made of Cu, formed with the screw portions 640d having the screw threads and the thread grooves alternately located in the direction Z on the outer surfaces 640c, and formed with holes 42 are prepared. Then, Ni plating is performed on surfaces of the bases 640. Thus, the Ni plating layers 41 are formed on the upper surfaces 40a, the lower surfaces 40b, and the outer surfaces 640c of the bases 640. Consequently, the embedded members 604 are formed.

Then, one of the embedded members 604 is arranged on the upper surface 3a of the Al member 603 from above (a Z1 side) to cover one of the embedding holes 631 of the Al member 603 in a plan view. Thereafter, the embedded member 604 is pressed from above (the Z1 side) while being rotated with a jig 102. Thus, the embedded member 604 is screwed to the embedding hole 631, as shown in FIG. 17. At this time, a screw portion 631e corresponding to a screw portion 640d of the outer surface 640c of the embedded member 604 is formed on the inner surface 631c of the embedding hole 631 while the embedded member 604 is screwed to the embedding hole 631. The embedded members 604 are screwed to the three respective embedding holes 631. The remaining steps of the manufacturing process according to the second modification of the fourth embodiment of the present invention are similar to those in the fourth embodiment.

According to the second modification of the fourth embodiment, as hereinabove described, the intermetallic compound layers 5 made of the Al—Ni intermetallic compound are formed on the interfaces between the inner surfaces 631c of the embedding holes 631 of the Al member 603 and the Ni plating layers 41 formed on the outer surfaces 640c of the bases 640 of the embedded members 604, whereby detachment of the embedded members 604 from the Al member 603 can be effectively inhibited. In addition, bonding strength between the Al member 603 and the embedded members 604 can be increased, and hence increase in electric resistance on the interfaces between the Al member 603 and the embedded members 604 resulting from loose bonding of the Al member 603 to the embedded members 604 can be inhibited.

According to the second modification of the fourth embodiment, as hereinabove described, the embedded members 604 are embedded in the embedding holes 631 by screwing the embedded members 604 formed as external threads to the embedding holes 631 formed as internal threads, whereby the embedded members 604 can be more strongly embedded in the embedding holes 631 as compared with a case the embedded members 604 are simply embedded in the embedding holes 631 of the Al member 603. Thus, the bonding strength between the Al member 603 and the embedded members 604 can be further increased, and hence detachment of the embedded members 604 from the Al member 603 can be more effectively inhibited.

According to the second modification of the fourth embodiment, as hereinabove described, no screw portion 631e constituted by the screw threads and the thread grooves is formed on the inner surfaces 631c of the embedding holes 631 before the embedded members 604 are embedded in the embedding holes 631, but the screw portions 631e are formed on the inner surfaces 631c of the embedding holes 631 when the embedded members 604 are screwed to the embedding holes 631, whereby the Al member 603 and the embedded members 604 can be brought into closer contact with the each other as compared with a case where the screw portions 631e are previously formed on the embedding holes 631, and hence the Al member 603 and the embedded members 604 can be more strongly bonded to each other. The remaining effects of the second modification of the fourth embodiment are similar to those of the aforementioned first embodiment.

Fifth Embodiment

A fifth embodiment of the present invention is now described with reference to FIGS. 19 and 20. In this fifth embodiment, such a case that no Ni plating layer is formed on a surface of a base 40 of an embedded member 704 in a bus bar 702 is described, unlike in the aforementioned first embodiment. The bus bar 702 is an example of the "connection plate for battery terminals" in the present invention. The embedded member 704 is an example of the "second member" in the present invention.

Figure 19:
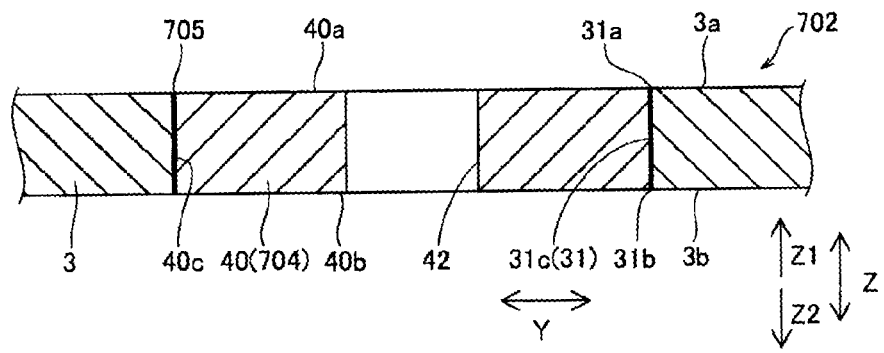
FIG. 19 A sectional view showing an embedding hole of an Al member and an embedded member according to a fifth embodiment of the present invention.

In the bus bar 702 according to the fifth embodiment of the present invention, no Ni plating layer is formed on the surface (the upper surface 40a, the lower surface 40b, and the outer surface 40c) of the base 40 of the embedded member 704, as shown in FIG. 19, unlike in the aforementioned first embodiment. Thus, the inner surface 31c of an embedding hole 31 comes into direct contact with the outer surface 40c of the base 40 of the embedded member 704. The bus bar 702 is so configured that the upper surface 40a and the lower surface 40b of the embedded member 704 are substantially coplanar with the upper surface 3a and the lower surface 3b of an Al member 3, respectively, in a state where the embedded member 704 is embedded in the embedding hole 31.

Figure 20:
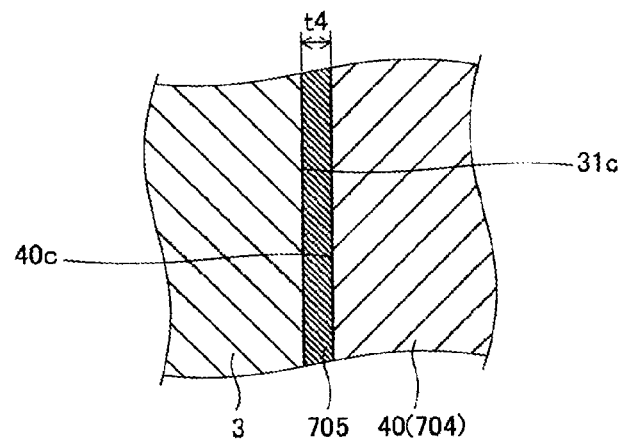
FIG. 20 An enlarged sectional view showing a bonding state between the Al member and the embedded member according to the fifth embodiment of the present invention.

According to the fifth embodiment, an intermetallic compound layer 705 is formed on an interface between the inner surface 31c of the embedding hole 31 and the outer surface 40c of the base 40 of the embedded member 704, as shown in FIG. 20. This intermetallic compound layer 705 is mainly made of an Al—Cu intermetallic compound formed by causing Al constituting the Al member 3 to react with Cu constituting the base 40. Furthermore, the intermetallic compound layer 705 has a thickness t4 of at least about 1 μm and not more than about 5 μm. The remaining structure according to the fifth embodiment of the present invention is similar to that of the aforementioned first embodiment.

A manufacturing process for the bus bar 702 according to the fifth embodiment of the present invention is similar to that of the aforementioned first embodiment except for performing no Ni plating on the surface of the base 40 of the embedded member 704 and forming the intermetallic compound layer 705 made of the Al—Cu intermetallic compound on the interface between the inner surface 31c of the embedding hole 31 and the outer surface 40c of the base 40 of the embedded member 704 by diffusion annealing.

According to the fifth embodiment, as hereinabove described, the intermetallic compound layer 705 made of the Al—Cu intermetallic compound is formed on the interface between the inner surface 31c of the embedding hole 31 of the Al member 3 and the outer surface 40c of the base 40 of the embedded member 704, whereby detachment of the embedded member 704 from the Al member 3 can be effectively inhibited. In addition, bonding strength between the Al member 3 and the embedded member 704 can be increased, and hence increase in electric resistance on the interface between the Al member 3 and the embedded member 704 resulting from loose bonding of the Al member 3 to the embedded member 704 can be inhibited.

According to the fifth embodiment, as hereinabove described, it is not necessary to perform Ni plating on the surface of the base 40 of the embedded member 704, and hence the manufacturing process for the bus bar 702 can be simplified. The remaining effects of the fifth embodiment are similar to those of the aforementioned first embodiment.

The embodiments and Examples disclosed this time must be considered as illustrative in all points and not restrictive. The range of the present invention is shown not by the above description of the embodiments and Examples but by the scope of claims for patent, and all modifications within the meaning and range equivalent to the scope of claims for patent are further included.

For example, while the example of embedding the embedded member(s) 4 (204, 304, 404, 504, 604, 704) including the base(s) 40 (240, 340, 440, 540, 640) made of Cu in the embedding hole(s) 31 (231, 331, 431, 531, 631) of the Al member 3 (203, 303, 403, 503, 603) made of Al and rendering the area of the Al member (the area occupied by Al) larger than the area of the embedded member(s) (the area occupied by Cu) has been shown in each of the aforementioned first to fifth embodiments, the present invention is not restricted to this. According to the present invention, the area occupied by Cu may be rendered larger than the area occupied by Al by embedding a second member(s) including a base(s) made of Al in an embedding hole(s) of a first member made of Cu. Thus, the area occupied by Cu having electric resistance lower than that of Al can be increased, and hence electric resistance on the bus bar can be further reduced.

While the example of forming the embedded member(s) 4 (204, 304, 404, 504, 604) by forming the Ni plating layer(s) 41 (the coating layer(s)) made of Ni on the surface(s) of the base(s) 40 (240, 340, 440, 540, 640) has been shown in each of the aforementioned first to fourth embodiments, the present invention is not restricted to this. According to the present invention, a coating layer(s) made of Ni alloy containing Ni may be formed on the surface(s) of the base(s), or a coating layer(s) made of metal other than Ni may be formed on the surface(s) of the base(s). In this case, metal having an ionization tendency lower than that of Al and higher than that of Cu, such as Zn, for example, is preferable as metal constituting the coating layer(s). It is more preferable that the coating layer(s) be made of metal improving the corrosion resistance of the base(s) made of Cu. Furthermore, the coating layer(s) may not be formed on the surface(s) of the base(s) by plating, but the coating layer(s) may be formed on the surface(s) of the base(s) by another method. For example, a cladding material having a Cu layer (the base) and a Ni layer (the coating layer), formed by applying a pressure to bond a plate material of Cu and a plate material of Ni to each other may be employed as the embedded member(s).

While the example of forming the Ni plating layer(s) 41 (the coating layer(s)) made of Ni on the upper surface(s) 40a, the lower surface(s) 40b, and the outer surface(s) 40c (240C, 340c, 440c, 540c, 640c) of the base(s) 40 (240, 340, 440, 540, 640) has been shown in each of the aforementioned first to fourth embodiments, the present invention is not restricted to this. According to the present invention, the coating layer(s) may not be formed on the upper surface(s) or the lower surface(s) of the base(s), but the coating layer(s) may be formed on only the outer surface(s) of the base(s). Thus, the usage of Ni can be reduced.

While the example of forming no screw portion 631e on the inner surfaces 631c of the embedding holes 631 before the embedded members 604 are embedded in the embedding holes 631 has been shown in the aforementioned second modification of the fourth embodiment, the present invention is not restricted to this. According to the present invention, the screw portions may be previously formed on the inner surfaces of the embedding holes before the embedded members are embedded in the embedding holes. Thus, the embedded members can be easily embedded in the embedding holes.

While the example of setting the width W1 of each of the bus bars 2 (202, 302, 402, 502, 602, 702) at about 50 mm and setting the thickness t1 thereof at about 3 mm has been shown in each of the aforementioned first to fifth embodiments, the present invention is not restricted to this. According to the present invention, the width and thickness of each of the bus bars are not particularly limited. In general, a large current flows in the bus bars of the lithium ion battery connections, and hence it is necessary to reduce the electric resistance of the bus bars. Therefore, it is preferable that the width and thickness of each of the bus bars be larger. Specifically, it is preferable that the width of each of the bus bars be at least about 10 mm and not more than about 200 mm and the thickness of each of the bus bars be at least about 1 mm and not more than about 4 mm.

While the example of providing no Ni plating layer 41 on the inner peripheral surfaces of the holes 42 into which the negative electrode-side terminals 1b of the lithium ion batteries 1 are inserted has been shown in each of the aforementioned first to fourth embodiments, the present invention is not restricted to this. According to the present invention, Ni plating layers may be provided also on the inner peripheral surfaces of the holes into which the negative electrode-side terminals of the lithium ion batteries are inserted. Thus, corrosion of the base(s) made of Cu under normal circumstances (such as in air) can be further inhibited. In the manufacturing process in this case, the holes are previously formed in the embedded member(s), Ni plating is then performed, and finally the embedded member(s) is embedded in the embedding hole(s) of the Al member.

While the example of pressing the embedded member(s) 4 (204, 304, 404, 504, 704) into the embedding hole(s) 31 (231, 331, 431, 531) of the Al member 3 (203, 303, 403, 503) has been shown in each of the aforementioned first to fifth embodiments (excluding the second modification of the fourth embodiment) and the example of screwing the embedded members 604 to the embedding holes 631 of the Al member 603 has been shown in the aforementioned second modification of the fourth embodiment, the present invention is not restricted to this. According to the present invention, the embedded member(s) may be embedded in the embedding hole(s) of the Al member by a method other than press fitting or screwing. The embedded member(s) may be embedded in the embedding hole(s) of the Al member by shrink fitting, for example. In shrink fitting, the Al member is first heated under a condition where the temperature is higher than the temperature (at least about 200° C. and not more than about 500° C.) for diffusion annealing, whereby the open width(s) of the embedding hole(s) of the Al member is increased to the extent that the embedded member(s) can be inserted thereinto. Then, the temperature is reduced to at least 200° C. and not more than about 500° C. in a state where the embedded member(s) is arranged in the embedding hole(s), whereby the embedded member(s) is embedded (shrink fitted) in the embedding hole(s). Thereafter, diffusion annealing is performed under a temperature condition of at least about 200° C. and not more than about 500° C. A sequence of these steps is performed in a non-oxidation atmosphere or a reducing atmosphere. The remaining steps of the manufacturing process employing shrink fitting are similar to those in the aforementioned first embodiment.

The invention claimed is:

1. A connection plate for battery terminals, comprising:
   a first member including a first hole into which a first battery terminal made of first metal is inserted and an embedding through hole, the first member being made of the first metal; and
   a second member having a second hole into which a second battery terminal made of second metal different from the first metal is inserted, including a base made of the second metal, the second member being embedded inside the embedding through hole of the first member,
   wherein an intermetallic compound layer made of an intermetallic compound containing at least one of the first metal and the second metal is formed on an interface between the embedding through hole of the first member and the second member.

2. The connection plate for battery terminals according to claim 1, wherein
   the first metal is one of Al and Cu,
   the second metal is the other of Al and Cu, and
   the intermetallic compound of the intermetallic compound layer contains at least Al.

3. The connection plate for battery terminals according to claim 1, wherein
   the second member further includes a coating layer arranged on at least an interface with the first member on a surface of the base, made of third metal different from the first metal and the second metal, and
   the intermetallic compound of the intermetallic compound layer has bonding strength between the first member and the second member larger than that of an intermetallic compound containing the first metal and the second metal and contains either the first metal or the second metal and the third metal.

4. The connection plate for battery terminals according to claim 3, wherein
   the third metal comprises metal having an ionization tendency higher than that of one of the first metal and the second metal and lower than that of the other of the first metal and the second metal.

5. The connection plate for battery terminals according to claim 4, wherein
   the first metal is one of Al and Cu,
   the second metal is the other of Al and Cu,
   the third metal is Ni, and
   the intermetallic compound of the intermetallic compound layer contains Al and Ni.

6. The connection plate for battery terminals according to claim 1, wherein
   the first member and the second member are made of rectangular plate materials having long sides extending in an identical direction and short sides extending in an identical direction in a plan view, and
   the long side and the short side of the second member are shorter than the long side and the short side of the first member, respectively.

7. The connection plate for battery terminals according to claim 1, wherein
   the embedding through hole of the first member has a circular shape in a plan view, and
   the second member has a columnar shape having the second hole.

8. The connection plate for battery terminals according to claim 1, wherein the second member has a frustoconical shape having the second hole, and the embedding through hole of the first member has a shape corresponding to the frustoconical shape of the second member.

9. The connection plate for battery terminals according to claim 1, wherein the embedding through hole of the first member is so configured that an open width thereof varies from a first surface of the first member toward a second surface thereof.

10. The connection plate for battery terminals according to claim 9, wherein the embedding through hole of the first member is so configured that the open width thereof gradually reduces from the first surface of the first member toward the second surface thereof.

11. The connection plate for battery terminals according to claim 9, wherein the embedding through hole of the first member is so configured that the open width thereof reduces from the first surface and the second surface of the first member toward a substantially central portion of the first member in a thickness direction.

12. The connection plate for battery terminals according to claim 1, wherein the embedding through hole of the first member has a substantially circular shape in a plan view, the second member has a cylindrical shape and is formed with a screw portion on an outer surface of the second member in contact with the embedding through hole, and the screw portion of the second member is embedded to be screwed to an inner surface of the embedding through hole of the first member.

13. A method for manufacturing a connection plate for battery terminals of claim 1, comprising steps of:

providing a first hole into which a first battery terminal made of first metal is inserted and an embedding through hole in which a second member including a base made of second metal different from the first metal is embedded in a first member made of metal identical to the first metal;

embedding the second member inside the embedding through hole of the first member;

providing a second hole into which a second battery terminal made of metal identical to the second metal is inserted in the second member; and forming an intermetallic compound layer made of an intermetallic compound containing at least one of the first metal and the second metal on an interface between the embedding through hole of the first member and the second member by diffusion annealing.

14. The method for manufacturing a connection plate for battery terminals according to claim 13, wherein the step of providing the second hole in the second member is performed after the step of embedding the second member inside the embedding through hole of the first member.

15. The method for manufacturing a connection plate for battery terminals according to claim 13, further comprising a step of forming a coating layer on at least an outer surface of the base of the second member by plating third metal different from the first metal and the second metal on at least the outer surface of the base before the step of embedding the second member in the embedding through hole of the first member, wherein the step of forming the intermetallic compound layer includes a step of forming the intermetallic compound layer made of an intermetallic compound having bonding strength between the first member and the second member larger than that of an intermetallic compound containing the first metal and the second metal and containing either the first metal or the second metal and the third metal on an interface between the embedding through hole of the first member and the outer surface of the second member by diffusion annealing.

16. The method for manufacturing a connection plate for battery terminals according to claim 13, wherein the step of embedding the second member in the embedding through hole of the first member includes a step of pressing the second member into the embedding through hole of the first member by applying a pressure to the second member from above in a state where the second member is arranged over the embedding through hole of the first member.

17. The method for manufacturing a connection plate for battery terminals according to claim 13, wherein the step of providing the first hole and the embedding through hole in the first member includes a step of providing the embedding through hole in the first member such that the embedding through hole is substantially circular in a plan view, and the step of embedding the second member in the embedding through hole of the first member includes a step of embedding the second member in the embedding through hole of the first member by screwing the second member having a cylindrical shape, formed with a screw portion on an outer surface thereof to an inner surface of the embedding through hole of the first member while rotating the second member.

18. The method for manufacturing a connection plate for battery terminals according to claim 13, further comprising a step of preparing the second member having a columnar shape with a first diameter, wherein the step of providing the first hole and the embedding through hole in the first member includes a step of forming the embedding through hole of the first member in a circular shape having a second diameter smaller than the first diameter of the second member, and the step of embedding the second member inside the embedding through hole of the first member includes a step of pressing the second member into the embedding through hole of the first member.

19. The method for manufacturing a connection plate for battery terminals according to claim 18, wherein the step of forming the embedding through hole of the first member in the circular shape having the second diameter has a step of forming the embedding through hole of the first member such that the second diameter is at least 0.2 mm and not more than 1.0 mm less than the first diameter.

20. The method for manufacturing a connection plate for battery terminals according to claim 13, further comprising a step of preparing the second member in a frustoconical shape having a first surface with a third diameter and a second surface with a fourth diameter smaller than the third diameter, wherein the step of providing the first hole and the embedding through hole in the first member includes a step of forming the embedding through hole of the first member in a circular shape having a fifth diameter smaller than the third diameter of the first surface of the second member, and the step of embedding the second member inside the embedding through hole of the first member includes a step of pressing the second member into the embedding through hole of the first member from a side of the second surface of the second member.

* * * * *